(12) United States Patent
Kojima

(10) Patent No.: US 11,692,093 B2
(45) Date of Patent: Jul. 4, 2023

(54) RESIN COMPOSITION, METHOD FOR PRODUCING THREE-DIMENSIONAL MOLDING USING SAME, AND THREE-DIMENSIONAL MOLDING

(71) Applicant: Konica Minolta, Inc., Tokyo (JP)

(72) Inventor: Takeshi Kojima, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 377 days.

(21) Appl. No.: 16/648,089

(22) PCT Filed: Sep. 18, 2018

(86) PCT No.: PCT/JP2018/034504
§ 371 (c)(1),
(2) Date: Mar. 17, 2020

(87) PCT Pub. No.: WO2019/059183
PCT Pub. Date: Mar. 28, 2019

(65) Prior Publication Data
US 2020/0263023 A1    Aug. 20, 2020

(30) Foreign Application Priority Data
Sep. 22, 2017    (JP) .............................. JP2017-182476

(51) Int. Cl.
| | | |
|---|---|---|
| C08L 33/12 | (2006.01) | |
| B33Y 10/00 | (2015.01) | |
| B29C 64/135 | (2017.01) | |
| B29C 64/371 | (2017.01) | |
| C08G 18/00 | (2006.01) | |
| C08G 59/02 | (2006.01) | |
| C08K 3/22 | (2006.01) | |
| C08K 3/30 | (2006.01) | |
| C08K 3/34 | (2006.01) | |
| C08K 3/40 | (2006.01) | |
| C08K 7/14 | (2006.01) | |
| C08K 9/06 | (2006.01) | |
| C08L 33/08 | (2006.01) | |
| C08L 75/04 | (2006.01) | |
| C08L 83/04 | (2006.01) | |
| B33Y 70/10 | (2020.01) | |
| B29K 33/00 | (2006.01) | |
| B29K 75/00 | (2006.01) | |
| B29K 83/00 | (2006.01) | |
| B29K 305/00 | (2006.01) | |
| B29K 307/04 | (2006.01) | |
| B29K 309/02 | (2006.01) | |
| B29K 309/08 | (2006.01) | |

(52) U.S. Cl.
CPC ............ *C08L 33/12* (2013.01); *B29C 64/135* (2017.08); *B29C 64/371* (2017.08); *B33Y 10/00* (2014.12); *B33Y 70/10* (2020.01); *C08G 18/00* (2013.01); *C08G 59/02* (2013.01); *C08K 3/22* (2013.01); *C08K 3/30* (2013.01); *C08K 3/346* (2013.01); *C08K 3/40* (2013.01); *C08K 7/14* (2013.01); *C08K 9/06* (2013.01); *C08L 33/08* (2013.01); *C08L 75/04* (2013.01); *C08L 83/04* (2013.01); *B29K 2033/12* (2013.01); *B29K 2075/00* (2013.01); *B29K 2083/00* (2013.01); *B29K 2205/00* (2013.01); *B29K 2305/00* (2013.01); *B29K 2307/04* (2013.01); *B29K 2309/02* (2013.01); *B29K 2309/08* (2013.01); *C08K 2003/2272* (2013.01); *C08K 2003/3063* (2013.01)

(58) Field of Classification Search
CPC ...... C08L 33/08; C08L 33/7504; C08L 83/04; C08G 19/00; C08K 3/22; C08K 3/30; C08K 3/348; C08K 3/40; C08K 7/14
See application file for complete search history.

(56) References Cited

FOREIGN PATENT DOCUMENTS

| | | |
|---|---|---|
| JP | H01-204915 A | 8/1989 |
| JP | H01-213304 A | 8/1989 |
| JP | H06-170954 A | 6/1994 |
| JP | 2001342204 A | 12/2001 |
| JP | 2005060673 A | 3/2005 |
| JP | 2007514805 A | 6/2007 |
| JP | 2010265408 A | 11/2010 |
| JP | 2013166893 A | 8/2013 |
| JP | 2015089943 A | 5/2015 |

(Continued)

OTHER PUBLICATIONS

JP 2007-514805 machine translation (Year: 2007).*

(Continued)

*Primary Examiner* — Edward J Cain
(74) *Attorney, Agent, or Firm* — Lucas & Mercanti, LLP

(57) ABSTRACT

Provided is a resin composition from which a three-dimensional molding can be produced at an appropriate speed and with high dimensional accuracy, wherein the obtained three-dimensional molding has high strength. This resin composition is used in a method for producing a three-dimensional molding composed of a cured product of a liquid resin composition by selectively irradiating the liquid resin composition with active energy rays. The resin composition includes at least: a first polymerizable compound, in a liquid state at room temperature, having radical polymerizability; a second polymerizable compound, in a liquid state at room temperature, having no radical polymerizability; and a filler, wherein the surface of the filler is covered with the second polymerizable compound.

14 Claims, 2 Drawing Sheets

(56) References Cited

FOREIGN PATENT DOCUMENTS

| JP | 2016509962 A | 4/2016 |
|---|---|---|
| JP | 2016509964 A | 4/2016 |
| JP | 2017007116 A | 1/2017 |
| JP | 2017513729 A | 6/2017 |

OTHER PUBLICATIONS

JP 2005-060673 machine translation (Year: 2005).*
JP 2015-089943 machine translation (Year: 2015).*
JP 2010-265408 machine translation (Year: 2010).*
JP 2017-513729 machine translation (Year: 2017).*
JP 2017-007116 machine translation (Year: 2017).*
JP 2001-342204 machine translation (Year: 2001).*
Principle and structure of photo-fabrication 3D printer (SLA, DLP); Mar. 9, 2017; i-maker.jp/blog/photopolymerization-9874.html (Japanese only).
International Search Report dated Dec. 18, 2018 for PCT/JP2018/034504 and English translation.
Written Opinion dated Dec. 18, 2018 for PCT/JP2018/034504 (English translation).
JPO, Notice of the Reasons for Rejection for the corresponding Japanese Patent Application No. 2019-543642, dated Dec. 7, 2021, with English translation.

* cited by examiner

RESIN COMPOSITION, METHOD FOR PRODUCING THREE-DIMENSIONAL MOLDING USING SAME, AND THREE-DIMENSIONAL MOLDING

CROSS REFERENCE TO RELATED APPLICATION

This Application is a 371 of PCT/JP2018/034504 filed on Sep. 18, 2018 which, in turn, claimed the priority of Japanese Patent Application No. 2017-182476 filed on Sep. 22, 2017, both applications are incorporated herein by reference.

TECHNICAL FIELD

The present invention relates to a resin composition, a method for producing a three-dimensional shaped object using the resin composition, and a three-dimensional shaped object.

BACKGROUND ART

Various methods capable of relatively easily producing a three-dimensional shaped object having a complex shape have been developed recently. As one method for producing a three-dimensional shaped object, there is known a method in which a liquid resin composition containing a compound to be cured by an active energy ray is selectively irradiated with an active energy ray to cure the resin composition into a desired shape (for example, PTL 1).

On producing the three-dimensional shaped object as described above, as a photocurable resin composition, have been used resin compositions containing a radical polymerizable compound such as urethane (meth)acrylate, oligoester (meth)acrylate, epoxy (meth)acrylate, a thiol and enic compound, or photosensitive polyimide (PTL 2 and the like) and resin compositions containing a cationic polymerizable compound such as an epoxy compound, a cyclic ether compound, a cyclic lactone compound, a cyclic acetal compound, a cyclic thioether compound, a spiroorthoester compound, or a vinyl ether compound (PTL 3 and the like).

Resin compositions containing a radical polymerizable compound here have advantages of a high curing rate and of a high mechanical strength of a three-dimensional shaped object to be obtained. Meanwhile, there is a problem in that shrinkage on curing is considerable and the dimensional accuracy of a three-dimensional shaped object to be obtained is likely to be lower. In contrast, resin compositions containing a cationic polymerizable compound have advantages of being unlikely to be shrunk on curing and of having high dimensional accuracy of a three-dimensional shaped object to be obtained. However, there are problems such as a relatively low curing rate and an insufficient mechanical strength of a three-dimensional shaped object to be obtained (especially impact resistance and toughness such as folding resistance).

It has been suggested that, for example, a resin composition containing both a radical polymerizable compound and a cationic polymerizable compound is used for producing a three-dimensional shaped object (for example, PTL 4). The resin composition can make the curing rate relatively higher and also can enhance the dimensional accuracy of a three-dimensional shaped object. However, three-dimensional shaped objects obtained from the resin composition have a problem of having mechanical properties and thermal properties inferior to those of three-dimensional shaped objects produced with versatile resins, and have been required to be improved in respect of these points.

Methods in which a liquid resin composition containing a radical polymerizable compound is continuously cured have been recently suggested as a novel method for producing a three-dimensional shaped object (PLTs 5 and 6). In the methods, first, a buffer region, in which the resin composition is not cured even when the composition is irradiated with an active energy ray, and a region for curing, in which the resin composition is cured by irradiation with an active energy ray are provided in a shaping tank. At this time, each region is formed such that the buffer region is positioned on the bottom part side of the shaping tank and the region for curing is positioned on the upper part side of the shaping tank. Then, a carrier to be the base point for three-dimensional shaping is placed in the region for curing, and the region for curing is selectively irradiated with an active energy ray from the buffer region (shaping tank bottom part) side. This leads to formation of a part of a three-dimensional shaped object (a cured product of the resin composition) on the carrier surface. Then, continuous irradiation of the carrier with an active energy ray while the carrier being elevated toward the shaping tank upper part side causes a cured product of the resin composition to be continuously formed under the carrier to thereby produce a seamless three-dimensional shaped object.

The buffer region described above is a region to be provided such that the shaping tank and a cured product of the resin composition do not come in contact with each other. Usually, to the buffer region, oxygen for inhibiting curing of the resin composition by the active energy ray is continuously supplied.

CITATION LIST

Patent Literatures

PTL 1 Japanese Patent Application Laid-Open No. H06-170954
PTL 2 Japanese Patent Application Laid-Open No. H01-204915
PTL 3 Japanese Patent Application Laid-Open No. H01-213304
PTL 4 Japanese Patent Application Laid-Open No. 2013-166893
PLT 5 Japanese Unexamined Patent Application Publication (Translation of PCT Application) No. 2016-509962
PLT 6 Japanese Unexamined Patent Application Publication (Translation of PCT Application) No. 2016-509964

SUMMARY OF INVENTION

Technical Problem

Application of three-dimensional shaped objects to various uses has been recently considered, and three-dimensional shaped objects having a higher strength are desired to be provided. Then, addition of a filler to a resin composition for producing a three-dimensional shaped object has been considered, for example. However, a common filler (for example, an inorganic filler) has a high affinity for oxygen. For this reason, in the case of addition of a filler to a resin composition containing a radical polymerizable compound, there has been a problem in that, on curing the resin composition, radical polymerization is likely to be inhibited by oxygen adsorbed on the filler (hereinafter, the phenomenon is also referred to as "oxygen inhibition"), and the strength of a three-dimensional shaped object to be obtained decreases instead.

The above oxygen inhibition has been likely to occur also when a filler is added to a resin composition containing both a radical polymerizable compound and a cationic polymerizable compound as mentioned above. Further, in the method described in PTL 5 or 6 mentioned above, since the resin composition and oxygen are mixed for forming the buffer region, oxygen inhibition is likely to occur due to addition of the filler. Accordingly, a resin composition that enables a three-dimensional shaped object having a high strength to be produced at a moderate shaping rate and with high dimensional accuracy has not yet been obtained under the present situation.

The present invention has been made in view of the above problems. That is to say, an object of the present invention is to provide a resin composition that enables a three-dimensional shaped object to be produced at a moderate rate and with high dimensional accuracy, the three-dimensional shaped object to be produced having a high strength.

Solution to Problem

A first aspect of the present invention provides the following resin composition.

[1] A resin composition that is used in a method for producing a three-dimensional shaped object comprising a cured product of the resin composition by selectively irradiating a liquid resin composition with an active energy ray, at least comprising: a first polymerizable compound liquid at normal temperature, the first polymerizable compound having radical polymerizability; a second polymerizable compound liquid at normal temperature, the second polymerizable compound having no radical polymerizability; and a filler, wherein the surface of the filler is coated with the second polymerizable compound.

[2] The resin composition according to [1], wherein the second polymerizable compound has a group that is polymerized by any of heat, a microwave, actinic radiation, water, an acid, a base, and an active energy ray.

[3] The resin composition according to [1] or [2], wherein the filler is at least one selected from the group consisting of organic polymer fibers, whisker-like inorganic compounds, clay compounds, glass, ceramics, metals, and carbon.

[4] The resin composition according to any one of [1] to [3], wherein the filler is fibrous.

[5] The resin composition according to [3], wherein the organic polymer fibers are polysaccharide nanofibers.

[6] The resin composition according to any one of [1] to [5], wherein the filler is surface-treated with a treating agent having a functional group reactive with the second polymerizable compound.

[7] The resin composition according to [6], wherein the treating agent is a silane coupling agent.

[8] The resin composition according to any one of [1] to [7], wherein the first polymerizable compound is an unsaturated carboxylate compound and/or an unsaturated carboxylic acid amide compound.

[9] The resin composition according to any one of [1] to [8], wherein the second polymerizable compound comprises at least one group selected from the group consisting of a cyclic ether group, a cyanate group, an isocyanate group, and a hydrosilyl group.

A second aspect of the present invention provides the following method for producing a three-dimensional shaped object and the three-dimensional shaped object.

[10] A method for producing a three-dimensional shaped object comprising: selectively irradiating the resin composition according to any one of [1] to [9] with an active energy ray to produce a primary cured product comprising a cured product of the first polymerizable compound.

[11] The method for producing a three-dimensional shaped object according to [10], comprising: selectively irradiating the resin composition filled in a shaping tank with an active energy ray to form a first shaped object layer comprising a cured product of the first polymerizable compound, supplying the resin composition on the first shaped object layer, and selectively irradiating the resin composition supplied in the supplying of the resin composition with an active energy ray to form a second shaped object layer comprising a cured product of the first polymerizable compound on the first shaped object layer, wherein the supplying of the resin composition and the forming of the second shaped object layer are repeated to thereby three-dimensionally form the primary cured product.

[12] The method for producing a three-dimensional shaped object according to [10], comprising: adjacently forming, in a shaped object tank, a buffer region comprising the resin composition and oxygen, where the curing of the first polymerizable compound is inhibited by oxygen, and a region for curing comprising at least the resin composition, where the concentration of oxygen is lower than that in the buffer region and the curing of the first polymerizable compound is enabled, and selectively irradiating the resin composition with an active energy ray from a side of the buffer region to cure the first polymerizable compound in the region for curing, wherein in the curing of the first polymerizable compound, the region for curing is continuously irradiated with an active energy ray while the cured product formed is continuously moved in a direction opposite to the buffer region to form the primary cured product.

[13] The method for producing a three-dimensional shaped object according to any one of [10] to [12], comprising curing the second polymerizable compound contained in the primary cured product by means of heat, a microwave, actinic radiation, water, an acid, a base, or an active energy ray after the formation of the primary cured product.

[14] A three-dimensional shaped object, wherein the three-dimensional shaped object is a cured product of the resin composition according to any one of [1] to [9].

Advantageous Effects of Invention

According to a method for producing a three-dimensional shaped object using the resin composition of the present invention, it is possible to produce a three-dimensional shaped object at a moderate rate and with high dimensional accuracy. According to the resin composition of the present invention, it is possible to produce a three-dimensional shaped object having a high strength.

DESCRIPTION OF EMBODIMENTS

Figure 1:
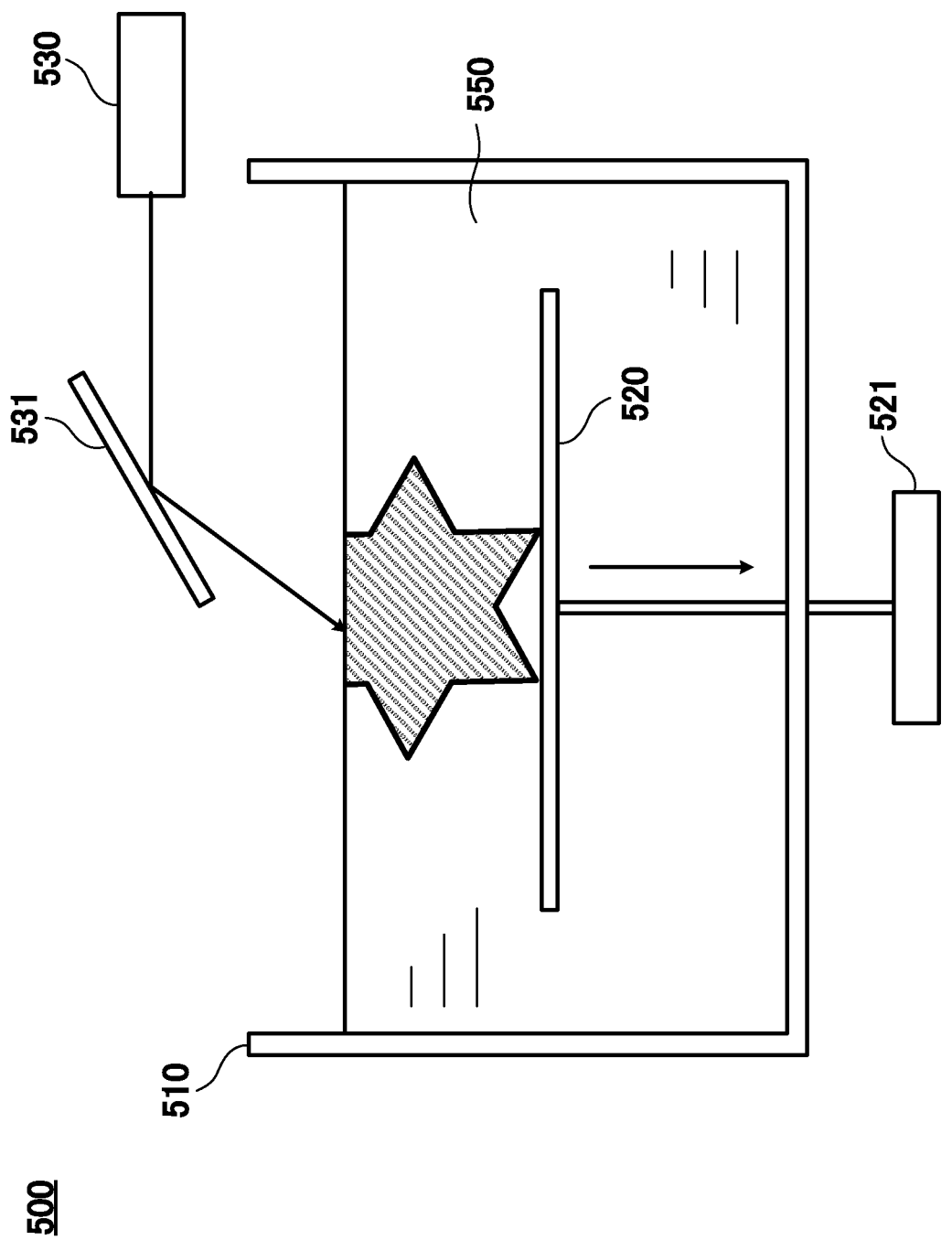
FIG. 1 schematically illustrates an apparatus for producing a three-dimensional shaped object according to one embodiment of the present invention.

As mentioned above, addition of a filler to various resin compositions has been considered in order to improve the strength of three-dimensional shaped objects and the like. However, common fillers have a high affinity for oxygen. When such a filler is caused to be contained in the resin composition containing a radical polymerizable compound, radical polymerization is likely to be inhibited by oxygen and the curing of the resin is likely to be insufficient, on curing the resin composition (curing by an active energy ray). Accordingly, even when a filler is added to the resin composition, there have been problems in that the strength of a three-dimensional shaped object is insufficiently enhanced, in that the strength decreases instead, and so on.

In contrast, in the resin composition of the present invention, the surface of the filler is coated with a second polymerizable compound having no radical polymerizability, that is, a compound unlikely to be subjected to polymerization inhibition by oxygen. For this reason, if the filler has adsorbed oxygen during preparing of the resin composition, the oxygen is unlikely to affect the polymerization of the radical polymerizable compound and the like. Thus, it is possible to sufficiently cure the resin composition, and a three-dimensional shaped object having a high strength is easily obtained. The resin composition contains a first polymerizable compound having radical polymerizability and a second polymerizable compound having no radical polymerizability. For this reason, the resin composition combines a relatively high curing rate derived from the first polymerizable compound with dimensional accuracy derived from the second polymerizable compound.

That the surface of the filler is coated with the second polymerizable compound only requires that the surface of the filler be coated with the second polymerizable compound so as not to substantially be in contact with first polymerizable compound, and the state thereof is not particularly limited. For example, each filler unit may be individually coated by the second polymerizable compound, or a plurality of filler units may be dispersed in a bulk of the second polymerizable compound or in the continuous second polymerizable compound, or the like.

Whether the surface of the filler is coated with the second polymerizable compound or not can be confirmed by image-observing a cross section of a cured product of the resin composition with a microscope. Specifically, a cured product of the resin composition is polished by a mechanical polishing apparatus to produce a cross section. Then, the cross section is subjected to ATR imaging measurement in an infrared microscope to analyze the type of the functional group of the resin present around the filler. This can identify the resin with which the filler is coated.

Hereinbelow, the resin composition will be described first, and then, a method for producing a three-dimensional shaped object using the resin composition will be described.

1. Resin Composition

The resin composition according to one embodiment of the present invention at least contains a first polymerizable compound in a liquid form having radical polymerizability, a second polymerizable compound in a liquid form having no radical polymerizability, and a filler. The resin composition usually also contains a radical polymerization initiator and a curing agent in addition to the above components. The resin composition may also contain various additives.

1-1. First Polymerizable Compound

The first polymerizable compound (hereinafter, also referred to as the "radical polymerizable compound") contained in the resin composition is only required to be a compound that is liquid at normal temperature and is radical-polymerized and cured by active energy ray irradiation. The radical polymerizable compound may be a monomer, may be an oligomer, may be a prepolymer, or may be a mixture thereof. The resin composition may contain only one radical polymerizable compound or may contain two or more radical polymerizable compounds. Examples of the active energy ray to polymerize the radical polymerizable compound include ultraviolet rays, X-rays, electron rays, γ-rays, and visible light rays.

The type of radical polymerizable compound is not particularly limited as long as the compound has a group that is radical-polymerizable by irradiation with an active energy ray, and the radical polymerizable compound can be a compound having one or more of, for example, an ethylene group, a propenyl group, a butenyl group, a vinylphenyl group, an allyl ether group, a vinyl ether group, a maleimide group, a (meth)acrylamide group, an acetyl vinyl group, a vinylamide group, and a (meth)acryloyl group in the molecule. Among these, the compound is preferably an unsaturated carboxylate compound containing one or more unsaturated carboxylate structures in the molecule to be mentioned below, and is particularly preferably a (meth)acrylate-based compound having a (meth)acryloyl group. Herein, the description of "(meth)acryl" denotes methacryl and/or acryl, the description of "(meth)amloyl" denotes methacryloyl and/or acryloyl, and the description of "(meth)acrylate" denotes methacrylate and/or acrylate.

Examples of the "compound having an allyl ether group" as one of the radical polymerizable compounds described above include phenyl allyl ether, o-, m- or p-cresol monoallyl ether, biphenyl-2-ol monoallyl ether, biphenyl-4-ol monoallyl ether, butyl allyl ether, cyclohexyl allyl ether, cyclohexanemethanol monoallyl ether, phthalic acid diallyl ether, isophthalic acid diallyl ether, dimethanoltricyclodecane diallyl ether, 1,4-cyclohexane dimethanol diallyl ether, alkylene (having 2 to 5 carbon atoms) glycol diallyl ether, polyethylene glycol diallyl ether, glycerin diallyl ether, trimethylolpropane diallyl ether, pentaerythritol diallyl ether, polyglycerin (having a degree of polymerization of 2 to 5) diallyl ether, trimethylolpropane triallyl ether, glycerin triallyl ether, pentaerythritol tetraallyl ether and tetraallyloxyethane, pentaerythritol triallyl ether, diglycerin triallyl ether, sorbitol triallyl ether, and polyglycerin (having a degree of polymerization of 3 to 13) polyallyl ether.

Examples of the "compound having a vinyl ether group" described above include butyl vinyl ether, butyl propenyl ether, butyl butenyl ether, hexyl vinyl ether, 1,4-butanediol divinyl ether, ethylhexyl vinyl ether, phenyl vinyl ether, benzyl vinyl ether, ethylethoxy vinyl ether, acetylethoxyethoxy vinyl ether, cyclohexyl vinyl ether, tricyclodecane vinyl ether, adamantyl vinyl ether, cyclohexanedimethanol divinyl ether, tricyclodecanedimethanol divinyl ether, EO adduct divinyl ether of bisphenol A, cyclohexanediol divinyl ether, cyclopentadiene vinyl ether, norbornyldimethanol divinyl ether, divinyl resorcin, divinyl hydroquinone, ethylene glycol divinyl ether, diethylene glycol divinyl ether, triethylene glycol divinyl ether, propylene glycol divinyl ether, dipropylene glycol vinyl ether, butylene divinyl ether, dibutylene glycol divinyl ether, 4-cyclohexane divinyl ether, oxanorbornene divinyl ether, neopentyl glycol divinyl ether, glycerin trivinyl ether, oxetane divinyl ether, glycerin ethylene oxide adduct trivinyl ether (having a mole number of ethylene oxide added of 6), trimethylolpropane trivinyl ether, trivinyl ether ethylene oxide adduct trivinyl ether (having a mole number of ethylene oxide added of 3), pentaerythritol trivinyl ether, ditrimethylolpropane hexavinyl ether, and oxyethylene adducts thereof.

Examples of the "compound having a maleimide group" described above include phenylmaleimide, cyclohexylmaleimide, and n-hexylmaleimide.

Examples of the "compound having a (meth)acrylamide group" described above include (meth)acrylamide, N,N-dimethyl (meth)acrylamide, N-ethyl (meth)acrylamide, N-isopropyl (meth)acrylamide, N-hydroxyethyl (meth)acrylamide, N-butyl (meth)acrylamide, isobutoxymethyl (meth)acrylamide, diacetone(meth)acrylamide, bismethyleneacrylamide, di(ethyleneoxy)bispropylacrylamide, tri(ethyleneoxy)bispropylacrylamide, and (meth)acryloylmorpholine.

Meanwhile, examples of the "(meth)acrylate-based compound" mentioned above include monofunctional (meth)acrylate monomers including isoamyl (meth)acrylate, stearyl (meth)acrylate, lauryl (meth)acrylate, butyl (meth)acrylate, pentyl (meth)acrylate, octyl (meth)acrylate, isooctyl (meth)acrylate, isononyl (meth)acrylate, decyl (meth)acrylate, isodecyl (meth)acrylate, tridecyl (meth)acrylate, isomyristyl (meth)acrylate, isostearyl (meth)acrylate, dicyclopentenyloxyethyl (meth)acrylate, dicyclopentenyl (meth)acrylate, 2-ethylhexyl (meth)acrylate, dimethylaminoethyl (meth)acrylate, diethylaminoethyl (meth)acrylate, 2-ethylhexyl-diglycol (meth)acrylate, 2-(meth)acryloyloxyethyl hexahydrophthalate, methoxyethoxyethyl (meth)acrylate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, pentachlorophenyl (meth)acrylate, pentabromophenyl (meth)acrylate, tetrahydrofurfuryl (meth)acrylate, dicyclopentanyl (meth)acrylate, cyclohexyl (meth)acrylate, isonorbornyl (meth)acrylate, polyethylene glycol mono(meth)acrylate, polypropylene glycol mono(meth)acrylate, glycerin (meth)acrylate, 7-amino-3,7-dimethyloctyl (meth)acrylate, 2-hydroxyethyl (meth)acrylate, 2-hydroxypropyl (meth)acrylate, 2-hydroxybutyl (meth)acrylate, 2-hydroxy-3-phenoxypropyl (meth)acrylate, benzyl (meth)acrylate, 2-(2-ethoxyethoxy)ethyl (meth)acrylate, 2-ethylhexyl carbitol (meth)acrylate, 2-(meth)aciyloyloxyethyl succinate, 2-(meth)acryloyloxyethyl phthalate, 2-(meth)acryloyloxyethyl-2-hydroxyethyl-phthalate, 2-(meth)acryloyloxyethyl hexahydrophthalate, and t-butylcyclohexyl (meth)acrylate; bifunctional (meth)acrylate monomers including triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, cyclohexane di(meth)acrylate, cyclohexane dimethanol di(meth)acrylate, neopentyl glycol di(meth)acrylate, tricyclodecane diyldimethylene di(meth)acrylate, dimethylol-tricyclodecane di(meth)acrylate, polyester di(meth)acrylate, bisphenol A PO adduct di(meth)acrylate, hydroxypivalic acid neopentyl glycol di(meth)acrylate, polytetramethylene glycol di(meth)acrylate, polyethylene glycol di(meth)acrylate, tripropylene glycol di(meth)acrylate, and tricyclodecane dimethanol di(meth)acrylate;
trifunctional or higher functional (meth)acrylatemonomers including trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, ditrimethylolpropane tetra(meth)acrylate, dipentaerythritol monohydroxy penta(meth)acrylate, glycerinpropoxy tri(meth)acrylate, and pentaerythritol ethoxy tetra(meth)acrylate; and oligomers and prepolymers thereof.

The "(meth)acrylate-based compounds" may be compounds obtained by further modifying various (meth)acrylate monomers or oligomers thereof (modified products). Examples of the modified product include ethylene oxide-modified (meth)acrylatemonomers such as triethylene glycol diacrylate, polyethylene glycol diacrylate, ethylene oxide-modified trimethylolpropane tri(meth)acrylate, ethylene oxide-modified pentaerythritol tetraacrylate, ethylene oxide-modified bisphenol A di(meth)acrylate, and ethylene oxide-modified nonylphenol (meth)acrylate; propylene oxide-modified (meth)acrylate monomers such as tripropylene glycol diacrylate, polypropylene glycol diacrylate, propylene oxide-modified trimethylolpropane tri(meth)acrylate, propylene oxide-modified pentaerythritol tetraacrylate, and propylene oxide-modified glycerin tri(meth)acrylate; caprolactone-modified (meth)acrylate monomers such as caprolactone-modified trimethylolpropane tri(meth)acrylate; and caprolactam-modified (meth)acrylate monomers such as caprolactam-modified dipentaerythritol hexa(meth)acrylate.

The "(meth)acrylate-based compounds" may further be compounds obtained by (meth)acrylating various oligomers (hereinafter also referred to as "modified (meth)acrylate-based compounds"). Examples of such a modified (meth)acrylate-based compound include polybutadiene (meth)acrylate oligomers, polyisoprene (meth)acrylate oligomers, epoxy (meth)acrylate oligomers, urethane (meth)acrylate-based compounds, silicone (meth)acrylate-based compounds, polyester (meth)acrylate oligomers, and linear (meth)acryl oligomers. Among these, particularly, epoxy (meth)acrylate-based compounds, urethane (meth)acrylate-based compounds, and silicone (meth)acrylate-based compounds can be suitably used. When the resin composition contains a urethane (meth)acrylate-based compound or a silicone (meth)acrylate-based compound, the starting point of a reaction with the second polymerizable compound to be mentioned below can be obtained in a molecular chain obtained by polymerizing the first polymerizable compound. Then, the polymer of the first polymerizable compound and the polymer of the second polymerizable compound are bonded to each other to thereby enhance the strength of a three-dimensional shaped object to be obtained.

The epoxy (meth)acrylate-based compound is only required to be a compound including one or more epoxy groups and one or more (meth)acrylate groups in a molecule, and examples thereof include bisphenol A-type epoxy (meth)acrylate, bisphenol F-type epoxy (meth)acrylate, bisphenyl-type epoxy (meth)acrylate, triphenylmethane-type epoxy (meth)acrylate, and novolac-type epoxy (meth)acrylates such as cresol novolac-type epoxy (meth)acrylate and phenol novolac-type epoxy (meth)acrylate.

The urethane (meth)acrylate-based compound can be a compound having a urethane bond and a (meth)acryloyl group, obtained by reacting an aliphatic polyisocyanate compound having two or more isocyanate groups or an aromatic polyisocyanate compound having two or more isocyanate groups with a (meth)acrylic acid derivative having a hydroxy group or the like.

Examples of the isocyanate compound as a raw material for the urethane (meth)acrylate-based compounds include isophorone diisocyanate, 2,4-tolylene diisocyanate, 2,6-tolylene diisocyanate, hexamethylene diisocyanate, trimethylhexamethylene diisocyanate, diphenylmethane-4,4'-diisocyanate (MDI), hydrogenated MDI, polymeric MDI, 1,5-naphthalene diisocyanate, norbornane diisocyanate, tolidine diisocyanate, xylylene diisocyanate (XDI), hydrogenated XDI, lysine diisocyanate, triphenylmethane triisocyanate, tris(isocyanatephenyl)thiophosphate, tetratetramethylxylylene diisocyanate, and 1,6,11-undecane triisocyanate.

Examples of the isocyanate compound as a raw material for the urethane (meth)acrylate-based compounds also include chain-extended isocyanate compounds obtained by a reaction between a polyol such as ethylene glycol, propylene glycol, glycerin, sorbitol, trimethylolpropane, carbonate diol, polyether diol, polyester diol, or polycaprolactone diol and an excess of an isocyanate compound.

Meanwhile, examples of the (meth)acrylic acid derivative having a hydroxy group as a raw material for the urethane (meth)acrylate-based compounds include hydroxyalkyl (meth)acrylates such as 2-hydroxyethyl (meth)acrylate, 2-hydroxypropyl (meth)acrylate, 2-hydroxybutyl (meth)acrylate, and 4-hydroxybutyl (meth)acrylate; mono(meth)acrylates of a dihydric alcohol such as ethylene glycol, propylene glycol, 1,3-propanediol, 1,3-butanediol, 1,4-butanediol, or polyethylene glycol; mono(meth)acrylates or di(meth)acrylates of a trihydric alcohol such as trimethylolethane, trimethylolpropane, or glycerin; and epoxy (meth)acrylates such as bisphenol A-type epoxy acrylate.

The urethane (meth)acrylate-based compound having the above structure may be a commercially available one, and examples thereof include M-1100, M-1200, M-1210, M-1600 (all manufactured by Toagosei Co., Ltd.), EBECRYL210, EBECRYL220, EBECRYL230, EBECRYL270, EBECRYL1290, EBECRYL2220, EBECRYL4827, EBECRYL4842, EBECRYL4858, EBECRYL5129, EBECRYL6700, EBECRYL8402, EBECRYL8803, EBECRYL8804, EBECRYL8807, EBECRYL9260 (all manufactured by DAICEL-ALLNEX LTD.), Art Resin UN-330, Art Resin SH-500B, Art Resin UN-1200TPK, Art Resin UN-1255, Art Resin UN-3320HB, Art Resin UN-7100, Art Resin UN-9000A, Art Resin UN-9000H (all manufactured by Negami chemical industrial Co., Ltd.), U-2HA, U-2PHA, U-3HA, U-4HA, U-6H, U-6HA, U-6LPA, U-10H, U-15HA, U-108, U-108A, U-122A, U-122P, U-324A, U-340A, U-340P, U-1084A, U-2061BA, UA-340P, UA-4000, UA-4100, UA-4200, UA-4400, UA-5201P, UA-7100, UA-7200, UA-W2A (all manufactured by Shin-Nakamura Chemical Co., Ltd.), and AH-600, AI-600, AT-600, UA-101I, UA-101T, UA-306H, UA-306I, UA-306T (all manufactured by KYOEISHA CHEMICAL Co., LTD.).

Meanwhile, as the urethane (meth)acrylate-based compound, a blocked isocyanate obtained by blocking isocyanate groups of a polyisocyanate with a blocking agent having a (meth)acrylate group may be used.

The polyisocyanate to be used for obtaining a blocked isocyanate may be an "isocyanate compound" to be a raw material of the urethane (meth)acrylate-based compound mentioned above or may be a compound obtained by reacting the compound with a polyol or polyamine. Examples of the polyol include conventionally known polyether polyols, polyester polyols, polymer polyols, vegetable oil polyols, additionally flame-retardant polyols such as phosphorus-containing polyols and halogen-containing polyols. One of these polyols may be contained in the block isocyanate or two or more of these may be contained therein.

Examples of the polyether polyol reacted with the isocyanate or the like include those produced by an addition reaction between a compound having at least two or more active hydrogen groups (specific examples include polyhydric alcohols such as ethylene glycol, propylene glycol, glycerin, trimethylolpropane, and pentaerythritol; amines such as ethylenediamine; and alkanolamines such as ethanolamine and diethanolamine), as a starting material, and an alkylene oxide (specific examples include ethylene oxide and propylene oxide) [For the method for preparing the polyether polyol, for example, the method described in Gunter Oertel, "Polyurethane Handbook" (1985) Hanser Publishers (German), p. 42-53 can be referred.]

Examples of the polyester polyol include products of a condensation reaction between a polyvalent carboxylic acid such as adipic acid or phthalic acid and a polyhydric alcohol such as ethylene glycol, 1,4-butanediol, and 1,6-hexanediol, wastes from nylon production, trimethylolpropane, wastes of pentaerythritol, wastes of phthalic acid-based polyesters, and polyester polyols derived from waste products after treatment (for example, see the description in Keiji Iwata, "Polyurethane Resin Handbook" (1987) THE NIKKAN KOGYO SHIMBUN, LTD. p. 117).

Examples of the polymer polyol described above include polymer polyols obtained by reacting the polyether polyol with an ethylenic unsaturated monomer (examples include butadiene, acrylonitrile, and styrene) in the presence of a radical polymerization catalyst. As the polymer polyol, ones having a molecular weight of the order of 5000 to 12000 are more preferable.

Examples of the vegetable oil polyol include hydroxyl group-containing vegetable oils such as castor oil and coconut oil. Also preferably used are castor oil derivative polyols obtained using castor oil or hydrogenated castor oil as a raw material. Examples of the castor oil derivative polyol include castor oil polyesters obtained by a reaction among castor oil, a polyvalent carboxylic acid, and a short-chain diol, and alkylene oxide adducts of castor oil or castor oil polyesters.

Examples of the flame-retardant polyol include phosphorous-containing polyols obtained by adding an alkylene oxide to a phosphoric acid compound; halogen-containing polyols obtained by ring-opening polymerization of epichlorohydrin or trichlorobutylene oxide; aromatic-based ether polyols obtained by adding an alkylene oxide to an active hydrogen compound having an aromatic ring; and aromatic-based ester polyols obtained by a condensation reaction between a polyvalent carboxylic acid having an aromatic ring and a polyhydric alcohol.

The hydroxyl value of the polyol to be reacted with the isocyanate or the like is preferably 5 to 300 mgKOH/g, more preferably 10 to 250 mgKOH/g. The hydroxyl value can be measured by the method defined in JIS-K0070.

Examples of the polyamine mentioned above to be reacted with isocyanate or the like include ethylenediamine, diethylenetriamine, triethylenetetramine, hexamethylenepentamine, bisaminopropylpiperazine, tris(2-aminoethyl)amine, isophoronediamine, polyoxyalkylenepolyamine, diethanolamine, and triethanolamine.

Meanwhile, the blocking agent for blocking isocyanate groups of a polyisocyanate is only required to be one that has a (meth)acryloyl group, reacts with an isocyanate group, and can be removed by heating.

Specific examples of such a blocking agent include t-butylaminoethyl methacrylate (TBAEMA), t-pentylaminoethyl methacrylate (TPAEMA), t-hexylaminoethyl methacrylate (THAEMA), t-butylaminopropyl methacrylate (TPAEMA), t-hexylaminoethyl methacrylate (THAEMA), and t-butylaminopropyl methacrylate (TBAPMA).

A blocking reaction of a polyisocyanate can be performed generally at −20 to 150° C., and is performed preferably at 0 to 100° C. At 150° C. or less, it is possible to prevent side reactions, and, in contrast, at −20° C. or more, the reaction rate can be set within a moderate range without being excessively low. The blocking reaction between a polyisocyanate compound and a blocking agent can be performed irrespective of the presence of a solvent. When a solvent is used, it is preferred to use a solvent inert to isocyanate groups. In the blocking reaction, a reaction catalyst can be used. Examples of a specific reaction catalyst include organometallic salts of tin, zinc, and lead, metal alcoholates, and tertiary amines.

By using such a blocked isocyanate prepared as mentioned above as a radical polymerizable compound, first, the acryloyl group moiety is polymerized by light irradiation. Then, the blocking agent is removed by heating. This removal enables an isocyanate compound produced to newly polymerize with a polyol, polyamine, or the like to thereby give a three-dimensional shaped object containing polyurethane, polyurea, or a mixture thereof.

Meanwhile, the silicone (meth)acrylate-based compound can be a compound having a polysiloxane bond in its main chain and including (meth)acrylic acid added at its terminal and/or side chain. Silicone as a raw material of a silicone (meth)acrylate-based compound can be an organopolysiloxane obtained by polymerizing a known monofunctional, bifunctional, trifunctional, or tetrafunctional silane compounds (for example, alkokysilane) in any combination. Specific examples of the silicone acrylate include, in addition to commercially available TEGO Rad 2500 (trade name manufactured by Tego Chemie Service GmbH), compounds obtained by esterifying an organo-modified silicone having —OH groups, such as X-22-4015 (trade name: manufactured by Shin-Etsu Chemical Co., Ltd.), and acrylic acid under an acid catalyst; and compounds obtained by reacting an organo-modified silane compound, such as epoxysilane, for example, KBM402 or KBM403 (trade name: both manufactured by Shin-Etsu Chemical Co., Ltd.) with acrylic acid.

Here, the total amount of the first polymerizable compound (radical polymerizable compound) contained in the resin composition is preferably 10 to 70 mass %, more preferably 20 to 60 mass %, further more preferably 30 to 50 mass % based on the total mass of the resin composition. When the amount of the first polymerizable compound is within the range, a cured product of the first polymerizable compound is more likely to take a desired shape on producing a three-dimensional shaped object, as mentioned below.

1-2. Second Polymerizable Compound

The second polymerizable compound is only required to be a compound that is liquid at normal temperature, has no radical polymerizability, and is cured by a polymerization mode other than radical polymerization. Examples of the polymerization mode other than radical polymerization include chain polymerization such as cationic polymerization and anionic polymerization; and sequential polymerization such as polycondensation, polyaddition, and addition condensation, and the compound may be polymerized may be any of the polymerization modes. Such a second polymerizable compound can be a compound having a group that is polymerized by, for example, heat, a microwave, actinic radiation, water, an acid, or a base. The second polymerizable compound may be a compound that is polymerized by an active energy ray having a wavelength different from that for the first polymerizable compound. The resin composition may contain only one second polymerizable compound or may contain two or more second polymerizable compounds.

Examples of such a second polymerizable compound include compounds having at least one group selected from the group consisting of a cyclic ether group, a cyanate group, an isocyanate group, and a hydrosilyl group.

Examples of a "compound having a cyclic ether group" include compounds including epoxide, oxetane, tetrahydrofuran, or tetrahydropyran. Among these, from the viewpoint of polymerizability and the like, compounds having an epoxy group (hereinafter, also referred to as "epoxy-based compounds") are preferable. Examples of the epoxy-based compound include epoxy-based compounds having one or two or more epoxy groups in the molecule. Examples of the epoxy-based compound include crystalline epoxy compounds such as biphenyl-type epoxy compounds, bisphenol A-type epoxy compounds, bisphenol F-type epoxy compounds, stilbene-type epoxy compounds, and hydroquinone-type epoxy compounds; novolac-type epoxy compounds such as cresol novolac-type epoxy compounds, phenol novolac-type epoxy compounds, and naphthol novolac-type epoxy compounds; phenol aralkyl-type epoxy compounds such as phenylene skeleton-containing phenol aralkyl-type epoxy compounds, biphenylene skeleton-containing phenol aralkyl-type epoxy compounds, and phenylene skeleton-containing naphthol aralkyl-type epoxy compounds; polyfunctional-type epoxy compounds such as triphenolmethane-type epoxy compounds, alkyl-modified triphenolmethane-type epoxy compounds, glycidylamine, and tetrafunctional naphthalene-type epoxy compound; modified phenol-type epoxy compounds such as dicyclopentadiene-modified phenol-type epoxy compounds, terpene-modified phenol-type epoxy compounds, and silicone-modified epoxy compounds; heterocyclic ring-containing epoxy compounds such as triazine nucleus-containing epoxy compounds; and naphthylene ether-type epoxy.

The "compound having a cyanate group" is only required to be a compound having one or two or more cyanate groups in the molecule. Examples thereof include 1,3- or 1,4-dicyanatobenzene; 1,3,5-tricyanatobenzene; 1,3-, 1,4-, 1,6-, 1,8-, 2,6-, or 2,7-dicyanatonaphthalene; 1,3,6-tricyanatonaphthalene; 2,2'- or 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3-dibromo-4-dicyanatophenyl)propane; bis(4-cyanatophenyl) ether; bis(4-cyanatophenyl)thioether; bis(4-cyanatophenyl) sulfone; tris(4-cyanatophenyl)phosphite; tris(4-cyanatophenyl)phosphate; bis(3-chloro-4-cyanatophenyl)methane; 4-cyanatobiphenyl; 4-cumylcyanatobenzene; 2-t-butyl-1,4-dicyanatobenzene; 2,4-dimethyl-1,3-dicyanatobenzene; 2,5-di-t-butyl-1,4-dicyanatobenzene; tetramethyl-1,4-dicyanatobenzene; 4-chloro-1,3-dicyanatobenzene; 3,3',5,5'-tetramethyl-4,4'dicyanatodiphenylbis(3-chloro-4-cyanatophenyl) methane; 1,1,1-tris (4-cyanatophenyl)ethane; 1,1-bis(4-cyanatophenyl)ethane; 2,2-bis(3,5-dichloro-4-cyanatophenyl)propane; 2,2-bis(3,5-dibromo-4-cyanatophenyl)propane; bis(p-cyanophenoxyphenoxy)benzene; di(4-cyanatophenyl)ketone; cyanated novolac; and cyanated bisphenol polycarbonate oligomers.

The "compound having an isocyanate group" is not particularly limited as long as the compound has one or two or more isocyanate groups in the molecule, and examples thereof include aromatic diisocyanates such as tolylene diisocyanate, xylylene diisocyanate, naphthylene diisocyanate, and diphenylmethane diisocyanate; alicyclic diisocyanates such as isophorone diisocyanate, dicyclohexylmethane diisocyanate, cyclohexylene diisocyanate, and methylcyclohexane diisocyanate; aliphatic diisocyanates such as hexamethylene diisocyanate; trifunctional or higher polyisocyanates such as triphenylmethane triisocyanate, tris (isocyanatephenyl)thiophosphate, 1:3 adducts of trimethylolpropane and hexamethylene diisocyanate, and cyclic trimers of hexamethylene diisocyanate; and blocked isocyanates having a blocked isocyanate group(s) obtained by protecting the isocyanate group(s) of these compound with a blocking agent (for example, an alcohol, a phenol, a lactam, an oxime, an alkyl acetoacetate, an alkyl malonate, a phthalimide, an imidazole, hydrogen chloride, hydrogen cyanide, or sodium hydrogen sulfite).

The "compound having a hydrosilyl group" is only required to be a compound having one or two or more hydrosilyl groups in the molecule, and examples thereof include methylhydrosiloxane-dimethylsiloxane copolymers. These "compounds having a hydrosilyl group" are obtained by an addition reaction with a polyorganosiloxane having a vinyl group at its terminal or side chain. Examples of the polysiloxane having a vinyl group include polydimethylsiloxanes having vinyl group-substitution at each terminal silicon atom, dimethylsiloxane-diphenylsiloxane copolymers having vinyl group-substitution at each terminal silicon atom, polyphenylmethylsiloxane having vinyl group-substitution at each terminal silicon atom, and vinylmethylsiloxane-dimethylsiloxane copolymers having a trimethylsilyl group at each terminal.

The above second polymerizable compound and a curing agent to be mentioned below are preferably contained in a total amount of 20 to 90 mass %, more preferably 30 to 80 mass %, even more preferably 40 to 60 mass % based on the total amount of the resin in the resin composition. When the second polymerizable compound and the curing agent are contained in a total amount within the range, the dimensional accuracy of a three-dimensional shaped object to be obtained is more likely to increase.

1-3. Filler

The filler contained in the resin composition is not particularly limited, and may be an organic filler or may be an inorganic filler. The resin composition may contain only one filler or may contain two or more fillers.

Examples of the filler include glass fillers composed of soda-lime glass, silicate glass, borosilicate glass, aluminosilicate zeolite, or quartz glass; ceramic fillers composed of alumina, zirconium oxide, titanium oxide, lead zirconate titanate, silicon carbide, silicon nitride, aluminum nitride, or tin oxide; metal fillers composed of an element metal such as iron, titanium, gold, silver, copper, tin, lead, bismuth, cobalt, antimony, or cadmium or an alloy thereof; carbon fillers composed of graphite, graphene, or carbon nanotubes; organic polymer fibers composed of polyester, polyimide, polyaramide, polyparaphenylene benzobisoxazole, or polysaccharides; whisker-like inorganic compounds composed of potassium titanate whiskers, silicone carbide whiskers, silicon nitride whiskers, α-alumina whiskers, zinc oxide whiskers, aluminum borate whiskers, calcium carbonate whiskers, magnesium hydroxide whiskers, basic magnesium sulfate whiskers, or calcium silicate whiskers (also including needle-like monocrystals of the ceramic fillers described above); and clay minerals composed of talc, mica, clay, wollastonite, hectorite, saponite, stevensite, beidellite, montmorillonite, nontronite, bentonite, swellable micas such as Na-type tetrasilisic fluorine mica, Li-type tetrasilisic fluorine mica, Na-type fluorine taeniolite, or Li-type fluorine taeniolite, or vermiculite. Furthermore, examples of the fillers also include polyolefin fillers composed of polyethylene or polypropylene; and fluorine resin fillers composed of FEP (tetrafluoroethylene-hexafluoropropylene copolymers), PFA (tetrafluoroethylene-perfluoroalkoxyethylene copolymers), or ETFE (tetrafluoroethylene-ethylene copolymer).

Among those described above, organic polymer fibers are preferable, and particularly, the filler is preferably nanofibers composed of polysaccharides. Examples of the polysaccharides include cellulose, hemicellulose, lignocellulose, chitin, and chitosan. Among these, from the viewpoint of further enhancing the strength of a three-dimensional shaped object to be obtained, cellulose and chitin are preferable, and cellulose is more preferable.

Fibrous fillers composed of cellulose, that is, cellulose nanofibers (hereinafter, also simply referred to as "nanocellulose") may be cellulose nanofibers mainly based on fibrous nanofibrils obtained by mechanical defibration of plant-derived fibers or plant cell wall, biosynthesis by acetic acid bacteria, oxidation by N-oxyl compounds such as 2,2,6,6-tetramethylpiperidine-1-oxyl radical (TEMPO), an electro-spinning method, or the like. The nanocellulose may be cellulose nanocrystals mainly based on nanofibrils crystallized in a whisker-like shape (needle-like shape) obtained by mechanically defibrating plant-derived fibers or plant cell wall followed by an acid treatment or the like, or may have other shapes. The nanocellulose is only required to be mainly based on cellulose and may contain lignin, hemicellulose, and the like. A nanocellulose not subjected to a delignification treatment and containing lignin, which is hydrophobic, is preferable because of its high affinity with the above second polymerizable compound and the like.

The shape of the above filler is not particularly limited, and may be, for example, fibrous (including whisker-like) or may be particulate. However, from the viewpoint of improving the strength of a three-dimensional shaped object, the shape is preferably fibrous. Generally, in a fibrous filler, branching or the like easily leads to an increase in its surface area and oxygen is likely to be adsorbed on the surface. Thus, the oxygen inhibition mentioned above is likely to occur. In contrast, in the present embodiment, the filler is coated with the second polymerizable compound, as mentioned above. For this reason, if the filler has any of the shapes, oxygen attached to the filler surface is unlikely to affect the polymerization of the radical polymerizable compound, and thus, a three-dimensional shaped object having a high strength is easily obtained.

When the filler is particulate, the average particle size is preferably 0.005 to 200 μm, more preferably 0.01 to 100 μm, even more preferably 0.1 to 50 μm. When the particulate filler has an average particle size of 0.1 μm or more, the strength of a three-dimensional shaped object is likely to be enhanced. In contrast, when the average particle size is 50 μm or less, a highly fine three-dimensional shaped object is more easily formed. The average particle size can be determined by taking an image of the resin composition with a transmission electron microscope (TEM) and analyzing the image.

In contrast, when the filler is fibrous, its average fiber diameter is preferably 0.002 μm or more and 20 μm or less. When the average fiber diameter is 0.002 μm or more, the strength of the three-dimensional shaped object is likely to be enhanced. When the average fiber diameter is 20 μm or less, the filler does not excessively enhance the viscosity of the resin composition, and the accuracy of a three-dimensional shaped object is likely to be satisfactory. The average fiber diameter of the filler is more preferably 0.005 μm or more and 10 μm or less, even more preferably 0.01 μm or more and 8 μm or less, particularly preferably 0.02 μm or more and 5 μm or less.

The average fiber length of the filler is 0.2 μm or more and 200 μm or less. When the average fiber length is 0.2 μm or more, the strength of a three-dimensional shaped object is likely to be enhanced. When the average fiber length is 100 μm or less, sedimentation of the filler, which occurs due to entanglement among filler fibers, is unlikely to occur. The average fiber length of the filler is more preferably 0.5 μm or more and 100 μm or less, even more preferably 1 μm or more and 60 μm or less, particularly preferably 1 μm or more and 40 μm or less.

The aspect ratio of the filler is preferably 10 or more and 10000 or less. When the aspect ratio is 10 or more, the strength of a three-dimensional shaped object in more likely to be enhanced. When the aspect ratio is 10000 or less, sedimentation of the filler, which occurs due to entanglement among filler fibers, is unlikely to occur. The aspect ratio of the filler is more preferably 12 or more and 8000 or less, even more preferably 15 or more and 2000 or less, particularly preferably 18 or more and 800 or less.

The average fiber diameter, average fiber length, and aspect ratio of the filler can be determined by taking an image of the resin composition with a transmission electron microscope (TEM) and analyzing the image.

Here, the amount of the filler contained in the resin composition is preferably 1 to 50 mass %, more preferably 5 to 40 mass % based on the total mass of the resin composition. When the amount of the filler is within the range, it is more likely to give a three-dimensional shaped object having a high strength.

Here, the filler may be surface-treated with a treating agent having a functional group reactive with the second polymerizable compound. When the filler is surface-treated, adhesion between the filler and the second polymerizable compound increases, and thus, it is more likely to give a three-dimensional shaped object having a higher strength. The treating agent is only required to be one having a group reactive with the second polymerizable compound and a group that can be bonded to the filler or can be adsorbed to the filler, and the type thereof is not particularly limited.

Examples of the group or structure that can be bonded to the filler or can be adsorbed to the filler, which group or structure is contained in the treating agent, include a Si atom, a Ti atom, a Zr atom, a carboxyl group, an amino group, an imino group, a cyano group, an azo group, an azi group, a thiol group, a sulfo group, a (meth)acryloyl group, an epoxy group, and an isocyanate group. Among these, from the viewpoint of reactivity to the filler and the like, a Si atom, a Ti atom, and a Zr atom are preferable, and a Si atom is particularly preferable. Examples of the group reactive with the second polymerizable compound, contained in the treating agent, include an amino group, an imino group, an epoxy group, a glycidyl group, an oxetanyl group, an isocyanate group, a cyanate group, a vinyl group, a styryl group, a hydrosilyl group, a mercapto group, and a ureido group.

From those described above, the treating agent is preferably a silane coupling agent, a titanium coupling agent, or a zirconium-based coupling agent, particularly preferably a silane coupling agent. Examples of the silane coupling agent include compounds having a reactive functional group such as vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, p-stylyltrimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, tris-(trimethoxysilylpropyl)isocyanurate, 3-ureidopropyltrialkoxysilane, 3-mercaptopropylmethyldimethoxysilane, 3-mercaptopropyltrimethoxysilane, and 3-isocyanatepropyltriethoxysilane;

compounds having an aliphatic hydrocarbon group such as trimethylmethoxysilane, trimethylethoxysilane, n-propyltrimethoxysilane, n-propyltriethoxysilane, n-propyltributoxysilane, isobutyltrimethoxysilane, isobutyltriethoxysilane, hexyltrimethoxysilane, diethyldimethoxysilane, diethyldiethoxysilane, dihexyldimethoxysilane, trihexylmethoxysilane, octyltriethoxysilane, decyltrimethoxysilane, hexadecyltrimethoxysilane, n-propyltriacetoxysilane, n-propyltrichlorosilane, 1-propyn-3-yltrimethoxysilane, 1-propyn-3-yltriethoxysilane, 1-propyn-3-yltributoxysilane, 2-cyclohexen-1-yltriethoxysilane, and 1,3-hexadiyn-5-yltriethoxysilane;

compounds having an aromatic hydrocarbon group such as phenyltrimethoxysilane, phenyltriethoxysilane, naphthyltrimethoxysilane, naphthyltriethoxysilane, antluyltrimethoxysilane, phenantluyltrimethoxysilane, biphenyltrimethoxysilane, diphenyldimethoxysilane, triphenylmethoxysilane, methylphenyldimethoxysilane, 2-methylbenzyltrimethoxysilane, 3-methylbenzyltrimethoxysilane, and 4-methylbenzyltrimethoxysilane; and silazane-based compounds such as hexamethyldisilazane Specific examples of the titanium coupling agent include trialkoxy titaniums such as methyltrimethoxy titanium, ethyltriethoxy titanium, n-propyltrimethoxy titanium, i-propyltriethoxy titanium, n-hexyltrimethoxy titanium, cyclohexyltriethoxy titanium, phenyltrimethoxy titanium, 3-chloropropyltriethoxy titanium, 3-aminopropyltrimethoxy titanium, 3-aminopropyltriethoxy titanium, 3-(2-aminoethyl)-aminopropyltrimethoxy titanium, 3-(2-aminoethyfi-aminopropyltriethoxy titanium, 3-(2-aminoethyfi-aminopropylmethyldimethoxy titanium, 3-anilinopropyltrimethoxy titanium, 3-mercaptopropyltriethoxy titanium, 3-isocyanatepropyltrimethoxy titanium, 3-glycidoxypropyltriethoxy titanium, 3-ureidopropyltrimethoxy titanium; dimethyldiethoxy titanium, diethyldiethoxy titanium, di-n-propyldimethoxy titanium, di-i-propyldiethoxy titanium, di-n-pentyldimethoxy titanium, di-n-octyldiethoxy titanium, di-n-cyclohexyldimethoxy titanium, and diphenyldimethoxy titanium.

Further, specific examples of the zirconium-based coupling agent include zirconium tri-n-butoxy.ethyl acetoacetate, zirconium di-n-butoxy.bis(ethyl acetoacetate), zirconium n-butoxy.tris(ethyl acetoacetate), zirconium tetrakis(n-propyl acetoacetate), zirconium tetrakis(acetyl acetoacetate), zirconium tetrakis(ethyl acetoacetate), and zirconium di-n-butoxy.bis(acetylacetonato).

Among those described above, silane coupling agents having a reactive functional group are particularly preferable. The method for surface-treating the filler with the treating agent is not particularly limited, and examples thereof can include a method in which the filler is dispersed in any solvent, a treating agent is added to the dispersion solution, after stirring, the solvent is removed off by filtration or the like, and the filler is heat-dried, and the like. When the filler is surface-treated with the treating agent, the treatment is preferably performed by adding of the order of 0.1 to 5 parts by mass of the treating agent based on 100 parts by mass of the filler.

1-4. Radical Polymerization Initiator

The radical polymerization initiator contained in the resin composition is not particularly limited as long as being a compound capable of generating a radical on irradiation with an active energy ray to thereby polymerize the first polymerizable compound mentioned above, and can be a known radical polymerization initiator.

Examples of the radical polymerization initiator include 2-hydroxy-2-methyl-1-phenylpropan-1-one (manufactured by BASF SE, IRGACURE 1173 ("IRGACURE" is a trademark of the company) and the like), 2-hydroxy-1-{4-[4-(2-hydroxy-2-methyl-propionyl)-benzyl]phenyl}-2-methyl-propan-1-one (manufactured by BASF SE, IRGACURE 127 and the like), 1-[4-(2-hydroxyethoxy)-phenyl]-2-hydroxy-2-methyl-1-propan-1-one (manufactured by BASF SE, IRGACURE 2959 and the like), 2,2-dimethoxy-1,2-diphenylethan-1-one (manufactured by BASF SE, IRGACURE 651 and the like), benzyldimethylketal, 1-(4-isopropylphenyl)-2-hydroxy-2-methylpropan-1-one, 4-(2-hydroxy ethoxy) phenyl-(2-hydroxy-2-propyl)ketone, 1-hydroxycyclohexyl-phenylketone, 2-methyl-2-morpholino (4-thiomethylphenyl)propan-1-one, 2-benzyl-2-dimethyl-amino-1-(4-morpholinophenyfi-butanone, benzoin, benzoinmethylether, benzoinisopropylether, diphenyl(2,4,6-trimethylbenzoyl)phosphine oxide, bis(2,4,6-trimethylbenzoyl)-phenylphosphine oxide, benzyl, methylphenyl glyoxy ester, benzophenone, methyl o-benzoylbenzoate-4-phenylbenzo-phenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, 3,3'-dimethyl-4-methoxybenzophenone, 2-isopropylthioxanthone, 2,4-dimethylthioxanthone, 2,4-diethylthioxanthone, 2,4-dichlorothioxanthone, Michler-ketone, 4,4'-diethylaminobenzophenone, 10-butyl-2-chloroacridone, 2-ethylanthraquinone, 9,10-phenanthrenequinone, camphorquinone, and 2,4-diethyloxanthen-9-one.

The radical polymerization initiator is preferably contained in an amount of 0.01 to 10 mass %, more preferably 0.1 to 5 mass %, even more preferably 0.3 to 3 mass % based on the total amount of the resin composition. When the radical polymerization initiator is contained in an amount within the range, it is possible to efficiently polymerize the first polymerizable compound (radical polymerizable compound) mentioned above.

1-5. Curing Agent

The resin composition may further contain a curing agent or a curing accelerator for curing the second polymerizable compound mentioned above. The type of the curing agent or curing accelerator is appropriately selected in accordance with the type and the like of the second polymerizable compound mentioned above.

Examples of the curing agent and the curing accelerator include aminos including linear aliphatic diamines having 2 to 20 carbon atoms such as ethylenediamine, trimethylenediamine, tetramethylenediamine, and hexamethylenediamine, metaphenylenediamine, paraphenylenediamine, paraxylenediamine, 4,4'-diaminodiphenylmethane, 4,4'-diaminodiphenylpropane, 4,4'-diaminodiphenylether, 4,4'-diaminodiphenylsulfone, 4,4'-diaminodicyclohexane, bis(4-aminophenyl)phenylmethane, 1,5-diaminonaphthalene, metaxylenediamine, paraxylenediamine, 1,1-bis(4-aminophenyl)cyclohexane, N,N-dimethyl-n-octyl amine, and dicyanoamide; resol-type phenol resins such as aniline modified resol resins and dimethyl ether resol resins; novolac-type phenol resins such as phenol novolac resins, cresol novolac resins, tert-butylphenol novolac resins, and nonylphenol novolac resins; phenol aralkyl resins such as phenylene skeleton-containing phenol aralkyl resins and biphenylene skeleton-containing phenol aralkyl resins; phenol resins having a fused polycyclic structure such as a naphthalene skeleton and an anthracene skeleton; polyoxystyrenes such as polyparaoxystyrene; acid anhydrides including alicyclic acid anhydrides such as hexahydrophthalic anhydride (HHPA) and methyltetrahydrophthalic anhydride (MTHPA) and aromatic acid anhydrides such as trimellitic anhydride (TMA), pyromellitic anhydride (PMDA), and benzophenone tetracarboxylic acid (BTDA); polymercaptan compounds such as polysulfides, thioesters, and thioethers; isocyanate compounds such as isocyanate prepolymers and blocked isocyanates; organic acids such as carboxylic acid-containing polyester resins; and organic metal salts such as zinc naphthenate, cobalt naphthenate, tin octylate, cobalt octylate, cobalt(II) bis acetylacetonate, cobalt(III) tris acetylacetonate, and zinc acetylacetonate. The resin composition may contain only one curing agent or curing accelerator or may contain two or more curing agents or curing accelerators. The amount of the curing agent or curing accelerator is appropriately selected in accordance with the type and amount of the thermosetting resin.

1-6. Other Components

The resin composition may further contain any additives such as a photosensitizer, a polymerization inhibitor, an ultraviolet absorber, an antioxidant, colorants such as dyes and pigments, an antifoaming agent, and a surfactant as long as the formation of a three-dimensional shaped object by irradiation with an active energy ray is enabled and no uniformity is markedly caused in a three-dimensional shaped object to be obtained.

1-7. Physical Properties of Resin Composition

The resin composition of the present invention has a viscosity at 25° C., measured with a rotary viscometer by a method according to JIS K-7117-1, of preferably 0.2 to 100 Pa·s, more preferably 1 to 10 Pa·s. When the viscosity of the resin composition is within the range, moderate flowability is achieved in the buffer region and the region for curing in the shaping tank. Thus, it is possible to improve the shaping rate, and additionally, the filler and the like are more unlikely to sediment in the resin composition. Furthermore, the strength of a three-dimensional shaped object is likely to be enhanced.

1-8. Method for Preparing Resin Composition

The above resin composition can be prepared, for example, by the following method. First, a second polymerizable compound and a filler are mixed, sufficiently stirred, and so on. Thereby, the filler surface is coated with the second polymerizable compound. Thereafter, a first polymerizable compound, a radical polymerization initiator, a curing agent, and the like are added to the mixture and further mixed. The mixing and stirring of the second polymerizable compound and the filler and the mixing and stirring of the other components can be performed by known methods.

As the apparatus for use in mixing of the resin composition, known apparatuses can be used. Examples thereof include media-less stirrers such as ULTRA-TURRAX (manufactured by IKA Co., Ltd.), TK Homomixer (manufactured by Primix Corporation), TK Pipeline Homomixer (manufactured by Primix Corporation), TK Fill Mix (manufactured by Primix Corporation), Cleamix (manufactured by M Technique Co., Ltd.), Clea SS5 (manufactured by M Technique Co., Ltd.), Cavitron (manufactured by Eurotech Co., Ltd.), and Fine Flow Mill (manufactured by Pacific Machinery & Engineering Co., Ltd.), media stirrers such as Visco mill (manufactured by Aimex Co., Ltd.), Apex Mill (manufactured by Kotobuki Industries Co., Ltd.), Star Mill (manufactured by Ashizawa Fine Tech Ltd.), DCP Super Flow (manufactured by Nippon Eirich Co., Ltd.), MP Mill (manufactured by INOUE MFG., INC.), Spike Mill (manufactured by INOUE MFG., INC.), Mighty Mill (manufactured by INOUE MFG., INC.), and SC Mill (manufactured by MitsuiMining Co., Ltd.), and high pressure impact-type dispersers such as Ultimizer (manufactured by Sugino Machine Limited), Star Burst (manufactured by Sugino Machine Limited), Nanomizer (manufactured by YOSHIDA KIKAI CO., LTD.), and NANO3000 (manufactured by Beryu Corporation).

Planetary centrifugal mixers such as Awatori Rentaro (manufactured by THINKY CORPORATION) and Kakuhunter (manufactured by SHASHIN KAGAKU CO., LTD.), planetary type mixers such as HIVIS MIX (manufactured by Primix Corporation) and HIVIS DISPER (manufactured by Primix Corporation), and ultrasonic disperser such as Nanoruptor (manufactured by SonicBio Co., LTD.) can also be suitably used.

2. Method for Producing Three-Dimensional Shaped Object

The liquid resin composition mentioned above can be used for a method for producing a three-dimensional shaped object including selective irradiation with an active energy ray to produce a primary cured product including a cured product of the first polymerizable compound.

In the method for producing a three-dimensional shaped object in which the resin composition mentioned above is used, first, the resin composition is selectively irradiated with an active energy ray to cure the first polymerizable compound into a desired shape to thereby form a primary cured product. The active energy ray is not particularly limited as long as the ray can sufficiently cure the first polymerizable compound, and examples thereof can include ultraviolet rays, X-rays, electron rays, γ-rays, and visible light rays. After the primary cured product is formed, the second polymerizable compound contained in the primary cured product is cured (polymerized) by an optional method to give a three-dimensional shaped object.

Examples of the method for producing such a three-dimensional shaped object include the following two embodiments, but the method of the present invention is not limited thereto.

2-1 Laminate Shaping Method

FIG. 1 schematically illustrates one example of an apparatus for producing a primary cured product by the laminate shaping method (apparatus for producing a three-dimensional shaped object). Production apparatus 500 includes shaping tank 510 that can store liquid resin composition 550, shaping stage 520 that can reciprocate in the vertical direction (depth direction) in shaping tank 510, base 521 that supports shaping stage 520, light source 530 of an active energy ray, galvano mirror 531 that guides the active energy ray into shaping tank 510, and the like.

Shaping tank 510 is only required to have a size that can accommodate a primary cured product to be produced. As light source 530 for active energy ray irradiation, known ones can be used. Examples of light source 530 for ultraviolet ray irradiation include semiconductor laser, metal halide lamps, mercury arc lamps, xenon arc lamps, fluorescent lamps, carbon arc lamps, tungsten-halogen copier lamps, and sunlight.

In the method, first, shaping tank 510 is filled with resin composition 550. Also at this time, shaping stage 520 is disposed lower than the liquid surface of resin composition 550 by a thickness corresponding to the thickness of a shaped object layer (first shaped object layer) to be produced. In this state, scanning is performed by guiding an active energy ray emitted from light source 530 with galvano mirror 531 or the like to irradiate resin composition 550 on shaping stage 520 with the active energy ray. At this time, the first shaped object layer is formed into a desired shape by selectively irradiating only a region to form the first shaped object layer with the active energy ray.

Thereafter, shaping stage 520 is lowered by a thickness corresponding to the thickness of one layer (the thickness of a second shaped object layer to be produced next) (moved in the depth direction) to submerge the first shaped object layer into resin composition 550. This provides the resin composition onto the first shaped object layer. Subsequently, in the same manner as described above, an active energy ray emitted from light source 530 is guided by galvano mirror 531 or the like to irradiate resin composition 550 positioned above the first shaped object layer with the active energy ray. Also at this time, only a region to form the second shaped object layer is selectively irradiated with the active energy ray. This allows the second shaped object layer to be laminated on the first shaped object layer.

Thereafter, lowering of shaping stage 520 (supply of the resin composition) and irradiation with an active energy ray are repeated to form a primary cured product in a desired shape. The shape of the primary cured product produced by the above method is the same as the shape of a three-dimensional shaped object finally produced.

Thereafter, a second polymerizable compound contained in the primary cured product is cured by various methods to thereby give a three-dimensional shaped object. A method for curing the second polymerizable compound is appropriately selected depending on the type of the second polymerizable compound (polymerization mode). The method may be, for example, a method including heating of the primary cured product or a method including irradiation with a microwave or actinic radiation. The method also may be a method in which the primary cured product is immersed in water, an acid, a base, or the like to react the product therewith. Further, an active energy ray having a wavelength different from that of the active energy ray applied for the production of the primary cured product may be applied to cure the second polymerizable compound.

Among those described above, the method including heating of the primary cured product or the method including applying an active energy ray having a wavelength different from that of the active energy ray applied for the production of the primary cured product is preferable, and the method including heating of the primary cured product is particularly preferable. When the primary cured product is heated, the temperature is preferably set to a temperature at which the primary cured product is not deformed, for example, preferably set to a temperature lower than Tg of a cured product of the first polymerizable compound.

2-2. Continuous Shaping Method

Figure 2A:
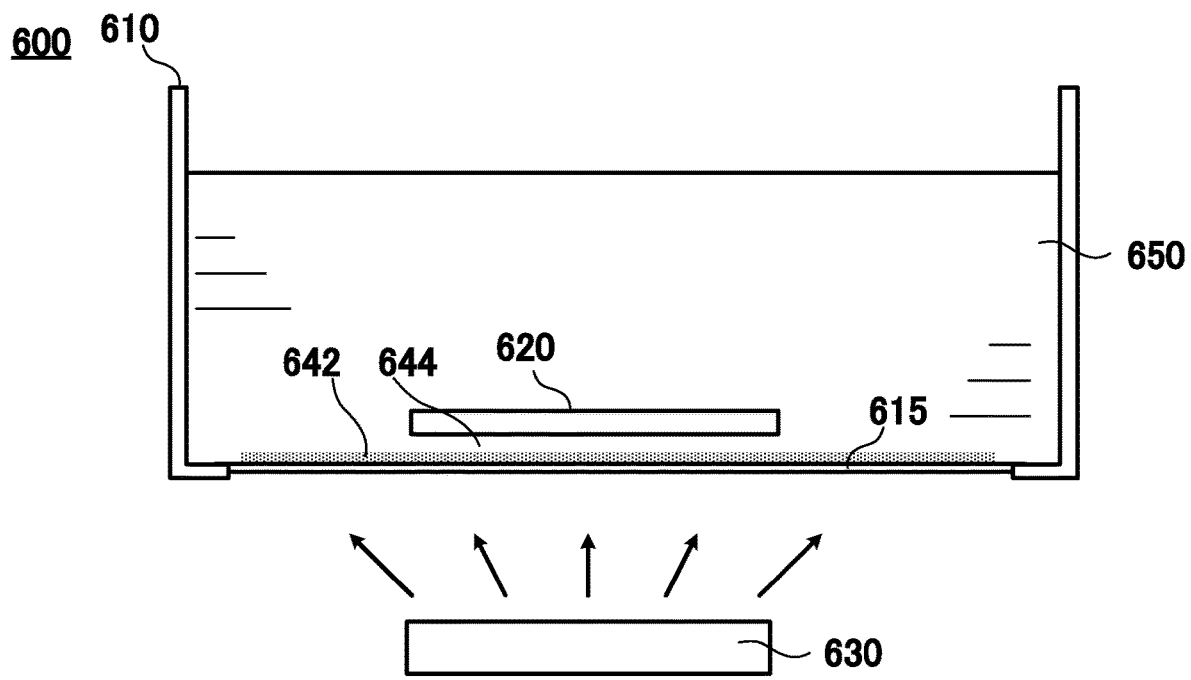
FIG. 2A schematically illustrates an apparatus for producing a three-dimensional shaped object according to another embodiment of the present invention.
Figure 2B:
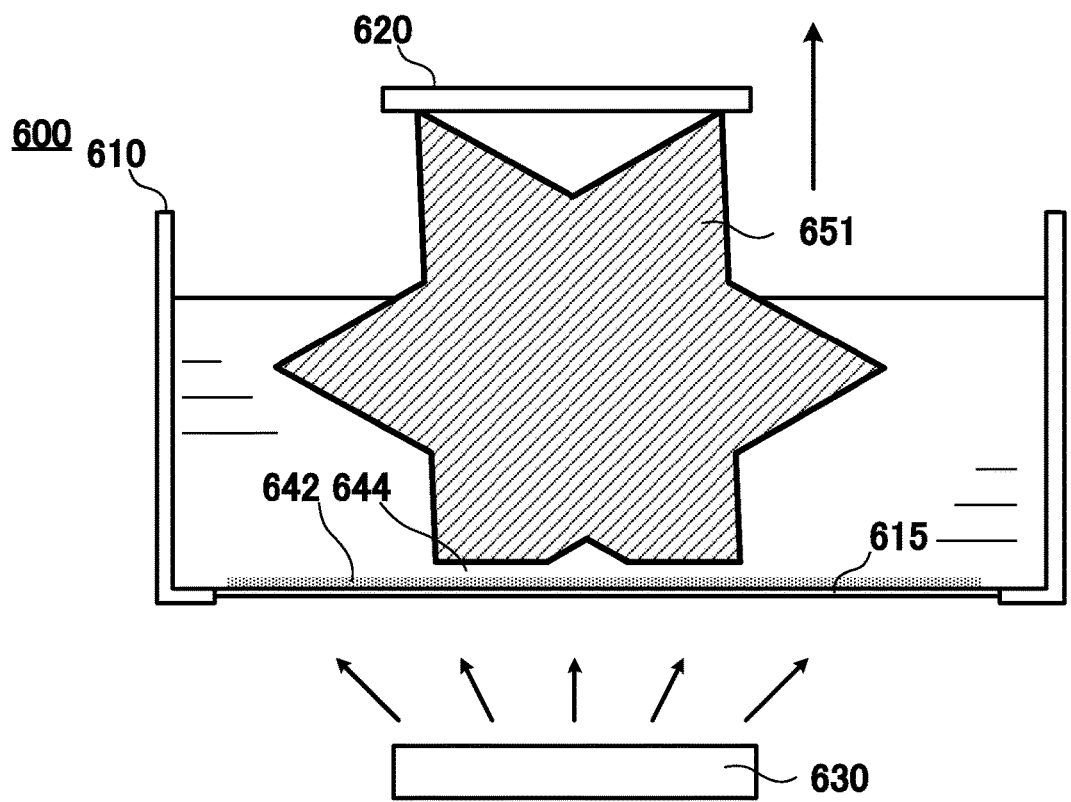
FIG. 2B schematically illustrates an apparatus for producing a three-dimensional shaped object according to another embodiment of the present invention.

FIG. 2A and FIG. 2B schematically illustrate one example of an apparatus that produces a primary cured product by a continuous shaping method (apparatus for producing a three-dimensional shaped object). As shown in FIG. 2A, production apparatus 600 includes shaping tank 610 that can store a liquid resin composition, shaping stage 620 that can reciprocate in the vertical direction (depth direction), light source 630 for irradiation with an active energy ray, and the like. Shaping tank 610 has window part 615 at its bottom part, which does not allow the resin composition to pass therethrough but allows actinic radiation and oxygen to pass therethrough. The material and the like of shaping tank 610 is not particularly limited as long as shaping tank 610 has a width larger than that of a three-dimensional shaped object to be produced and does not interact with the resin composition. The material of window part 615 is also not particularly limited as long as the objects and effects of the present invention are not impaired.

As light source 630 for irradiation with an active energy ray, known ones can be used. Examples of light source 630 for ultraviolet ray irradiation include semiconductor laser, metal halide lamps, mercury arc lamps, xenon arc lamps, fluorescent lamps, carbon arc lamps, tungsten-halogen copier lamps, and sunlight. It is possible to surface-irradiate a desired region with an active energy ray by using a spatial light modulator (SLM) projection light system having an SLM such as a crystal liquid panel or a digital mirror device (DMD) as light source 630.

In the method, first, shaping tank 610 is filled with resin composition 650 mentioned above. Then, oxygen is introduced from window part 615 provided in the bottom part of shaping tank 610 to the bottom part side of shaping tank 610. The method for introducing oxygen is not particularly limited and can be, for example, a method in which the outside of shaping tank 610 is set to have an atmosphere having a high concentration of oxygen, and a pressure is applied to the atmosphere, or the like.

Supplying oxygen from window part 615 into shaping tank 610 in this way leads to an increase in the oxygen concentration in a region on the side of window part 615, and buffer region 642 is formed, in which the first polymerizable compound is not cured even when irradiated with an active energy ray. In contrast, in the region above buffer region 642, the oxygen concentration becomes sufficiently lower than that of buffer region 642, and the region will be region for curing 644, in which the first polymerizable compound can be cured by irradiation with an active energy ray.

Subsequently, performed is selectively irradiating region for curing 644 with an active energy ray from the side of buffer region 642 to form a cured product of the first polymerizable compound in region for curing 644. Specifically, as shown in FIG. 2A, shaping stage 620 to be the base point for production of the primary cured product is disposed in proximity to the interface between region for curing 644 and buffer region 642. Then, the bottom surface side of shaping stage 620 is selectively irradiated with an active energy ray from light source 630 disposed on the side of buffer region 642. This causes curing of the first polymerizable compound in the resin composition in proximity to the bottom surface of shaping stage 620 (region for curing 644) to thereby form the top part of the primary cured product.

Thereafter, as shown in FIG. 2B, shaping stage 620 is elevated (moved in the direction away from buffer region 642). This causes uncured resin composition 650 to be freshly supplied from cured product 651 to region for curing 644 on the bottom part side of shaping tank 610. Then, an active energy ray from light source 630 is irradiated continuously and selectively (to a region to be cured) while shaping stage 620 and cured product 651 are continuously elevated. This allows the cured product to be continuously formed from the bottom surface of shaping stage 620 to the bottom part side of shaping tank 610 to thereby produce a primary shaped object having no seam and having a high strength. Also in the present embodiment, the shape of the primary cured product is the same as the shape of a three-dimensional shaped object to be finally produced.

Thereafter, the second polymerizable compound contained in the primary cured product is cured by various methods as required to thereby give a three-dimensional shaped object. The method for curing the second polymerizable compound is appropriately selected depending on the type of the second polymerizable compound (polymerization mode) and the like, and may be the same as the method for curing the second polymerizable compound in the laminate shaping method.

Examples

Hereinbelow, specific examples of the present invention will be described. The examples, however, shall not be construed as limiting the scope of the present invention.

1. Preparation of Filler

Fillers shown below were used in Examples and Comparative Examples.

Magnesium Sulfate Whiskers Whiskers 1 (Untreated)

Basic magnesium sulfate whiskers (MOS HIGE (average fiber diameter: 0.5μ, average fiber length: 20 μm) manufactured by Ube Material Industries, Ltd.) were used as magnesium sulfate whiskers 1.

Magnesium Sulfate Whiskers Whiskers 2 (Treated with a Treating Agent)

To 900 g of water, 100 g of magnesium sulfate whiskers 1 was added and the mixture was stirred with a stirrer. Thereafter, to the dispersion, 1.5 g of N-2-(aminoethyl)-3-aminopropyltrimethoxysilane (KBM-603 manufactured by Shin-Etsu Chemical Co., Ltd.) was added, and the mixture was continued to stir for 20 minutes and filtered. Then, a product obtained by drying the residue at 120° C. for an hour was used as magnesium sulfate whiskers 2.

Glass Particles 1 (Untreated)

Micro glass beads EMB-10 (average particle size: 5 μm) manufactured by Potters-Ballotini Co., Ltd. were used as glass particles 1.

Glass Particles 2 (Treated with a Treating Agent)

To 900 g of water, 100 g of glass particles 1 was added and the mixture was stirred with a stirrer. Thereafter, to the dispersion, 1.5 g of 3-glycidoxypropyltrimethylsilane (KBM-403 manufactured by Shin-Etsu Chemical Co., Ltd.) was added, and the mixture was continued to stir for 20 minutes and filtered. Then, a product obtained by drying the residue at 120° C. for an hour was used as glass particles 2.

Glass Fibers 1 (Untreated)

Glass fibers (FILATOMICTER FM350-9KS manufactured by Nippon Muki Co., Ltd.) were pulverized in a ball mill PM100CM manufactured by Retsch GmbH. The pulverized fibers having an average fiber diameter of 1 μm and an average fiber length of 20 μm were used as glass fibers 1.

Glass Fibers 2 (Treated with a Treating Agent)

To 900 g of water, 100 g of glass fibers 1 was added and the mixture was stirred with a stirrer. Thereafter, to the dispersion, 1.5 g of hexyltriethoxysilane (KBE-3063 manufactured by Shin-Etsu Chemical Co., Ltd.) was added, and the mixture was continued to stir for 20 minutes and filtered. Then, a product obtained by drying the residue at 120° C. for an hour was used as glass fibers 2.

Glass Fibers 3 (Treated with a Treating Agent)

To 900 g of water, 100 g of glass fibers 1 was added and the mixture was stirred with a stirrer. Thereafter, to the dispersion, 1.5 g of 3-aminopropyltrimethoxysilane (KBM-903 manufactured by Shin-Etsu Chemical Co., Ltd.) was added, and the mixture was continued to stir for 20 minutes and filtered. Then, a product obtained by drying the residue at 120° C. for an hour was used as glass fibers 3.

Carbon Particles 1 (Untreated)

Artificial graphite SGP manufactured by SEC Carbon, Ltd. (average particle size: 10 μm) was used as carbon particles 1.

Carbon Fibers 1 (Treated with a Treating Agent)

To 900 g of water, 100 g of Torayca milled fiber MLD-30 manufactured by Toray Industries, Inc. (average fiber diameter: 7 μm, average fiber length: 30 μm) and the mixture was stirred with a stirrer. Thereafter, to the dispersion, 1.5 g of 3-isocyanatepropyltriethoxysilane (KBE-9007 manufactured by Shin-Etsu Chemical Co., Ltd.) was added, and the mixture was continued to stir was continued for 20 minutes and filtered. Then, a product obtained by drying the residue at 120° C. for an hour was used as carbon fibers 1.

Metal Particles 1 (Untreated)

Iron oxide (III) nanoparticles NP-FE$_2$O$_3$ manufactured by EM Japan Co., Ltd. (average particle size 100 nm) were used as metal particles 1.

Metal Fibers 1 (Treated with a Treating Agent)

To 900 g of water, 100 g of silver nanowire NW-AG-20 manufactured by EM Japan Co., Ltd. (average fiber diameter: 20 nm, average fiber length: 20 μm) was added and the mixture was stirred with a stirrer. To the dispersion, 1.5 g of hexamethyldisilazane (SZ-31 manufactured by Shin-Etsu Chemical Co., Ltd.) was added, and the mixture was continued to stir for 20 minutes and filtered. Then, metal fibers 1 were obtained by drying the residue at 120° C. for an hour.

Polysaccharide Nanofibers 1 (Untreated)

A dispersion obtained by solvent-substituting BiNFi-s that is a 2 mass % dispersion of cellulose nanofibers manufactured by Sugino Machine Limited, with ethanol was used as polysaccharide nanofibers 1.

Polysaccharide Nanofibers 2 (Treated with a Treating Agent)

While 1000 g of BiNFi-s that is a 2 mass % dispersion of cellulose nanofibers manufactured by Sugino Machine Limited was stirred with a stirrer, 0.3 g of 3-isocyanatepropyltriethoxysilane (KBE-9007 manufactured by Shin-Etsu Chemical Co., Ltd.) was added thereto. Thereafter, the mixture was continued to stir for 20 minutes, and solvent-substituted with ethanol to obtain polysaccharide nanofibers 2.

Polysaccharide Nanofibers 3 (Untreated)

Into 5000 g of distilled water, 100 g of softwood Kraft pulp was suspended. To the suspension, a solution obtained by dissolving 1 g of TEMPO (2,2,6,6-tetramethylpiperidine 1-oxyl) and 10 g of sodium bromide in 500 g of distilled water was further added. Subsequently, 600 g of a 2 mol/L sodium hypochlorite aqueous solution was added dropwise to start an oxidation reaction. The pH during the reaction was maintained at 10 by adding a sodium hydroxide aqueous solution. When the amount of sodium hydroxide added was reached 4.5 mmol/g based on the dry weight of the raw material cellulose, about 200 mL of ethanol was added to stop the reaction. Thereafter filtering washing with distilled water using nylon mesh having a pore size of 20 μm was repeated to obtain oxidized pulp. Diluted was 50 g of the obtained oxidized pulp with distilled water to obtain 5 L of a mixed solution. This mixed solution was subjected to defibration treatment at a pressure of 100 MPa using a NanoVater manufactured by Yoshida Kikai Co., Ltd., which is a wet-type high pressure dispersion apparatus. The resulting dispersion was solvent-substituted with ethanol to obtain polysaccharide nanofibers 3.

Ceramic Particles 1 (Untreated)

Aluminum oxide nanoparticles NP-ALO manufactured by EM Japan Co., Ltd. (average particle size: 80 nm) was used as ceramic particles 1.

Ceramic Fibers 1 (Treated with a Treating Agent)

To 900 g of water, 100 g of titanium nanowire NW-TIO-A manufactured by EM Japan Co., Ltd. (average fiber diameter: 100 nm, average fiber length: 20 μm) was added and the mixture was stirred with a stirrer. To the dispersion, 5 g of vinyltrimethoxysilane (KBM-1003 manufactured by Shin-Etsu Chemical Co., Ltd.) was added, the mixture was continued to stir for 20 minutes and then filtered. Then, ceramic fibers 1 were obtained by drying the residue at 120° C. for an hour.

Clay Mineral 1 (Untreated)

Nano Talc D-600 manufactured by NIPPON TALC Co., Ltd. (average particle size 0.6 μm) was used as clay mineral 1.

2. Preparation of Resin Composition

Sample 1

Mixed were 237.5 g of urethane acrylate (CN983 manufactured by Sartomer Inc.), 171 g of diethylene glycol dimethacrylate (SR231 manufactured by Sartomer Inc.), and 57 g bisphenol A-type epoxy acrylate (CN153 manufactured by Sartomer Inc.) as a first polymerizable compound (A), 9.5 g of diphenyl-2,4,6-trimethylbenzoyl phosphine oxide (Irgacure TPO) as a radical polymerization initiator (D), 190 g of 4,4'-methylenebis(2,6-dimethylaniline) as a curing agent (E), and 285 g of poly[2-(chloromethyloxirane-alt-4,4'-(propan-2,2-diyl)diphenol](Araldite 506 manufactured by Huntsman Corporation) as a second polymerizable compound (B). Then, the mixture was kneaded at a revolution speed of 60 rpm and a rotation speed of 180 rpm for five minutes in a planetary-type kneader (HIVIS MIX 2P-1 manufactured by PRIMIX Corporation).

Sample 2

Mixed were 225 g of urethane acrylate (CN983 manufactured by Sartomer Inc.), 162 g of diethylene glycol dimethacrylate (SR231 manufactured by Sartomer Inc.), and 54 g of bisphenol A-type epoxy acrylate (CN153 manufactured by Sartomer Inc.) as the first polymerizable compound (A), 9 g of diphenyl-2,4,6-trimethylbenzoyl phosphine oxide (Irgacure TPO) as the radical polymerization initiator (D), 180 g of 4,4'-methylenebis(2,6-dimethylaniline) as the curing agent (E), and 100 g of magnesium sulfate whiskers whiskers 1 as a filler (C). The mixture was kneaded at a revolution speed of 60 rpm and a rotation speed of 180 rpm for five minutes in a planetary-type kneader (HIVIS MIX 2P-1 manufactured by PRIMIX Corporation).

Subsequently, 270 g of poly[2-(chloromethyl)oxirane-alt-4,4'-(propan-2,2-diyl)diphenol](Araldite 506 manufactured by Huntsman Corporation) as the second polymerizable compound (B) was added to the mixed solution, and the mixture was kneaded for further five minutes.

Sample 3

Sample 3 was prepared in the same manner as for Sample 2 except that all the components were fed simultaneously in a planetary-type kneader (HIVIS MIX 2P-1 manufactured by PRIMIX Corporation) and kneaded at a revolution speed of 60 rpm and a rotation speed of 180 rpm for 10 minutes.

Sample 4

Sample 4 was prepared in the same manner as for Sample 2 except that the components other than the filler (C) were fed into a planetary-type kneader (HIVIS MIX 2P-1 manufactured by PRIMIX Corporation) and kneaded at a revolution speed of 60 rpm and a rotation speed of 180 rpm for five minutes, then the filler (C) was added thereto, and the mixture was kneaded for further five minutes.

Sample 5

Sample 5 was prepared in the same manner as for Sample 2 except that the second polymerizable compound (B) and the filler (C) were fed into a planetary-type kneader (HIVIS MIX 2P-1 manufactured by PRIMIX Corporation) and kneaded at a revolution speed of 60 rpm and a rotation speed of 180 rpm for five minutes, then the other components were added thereto, and the mixture was kneaded for further five minutes.

Sample 6

Sample 6 was prepared in the same manner as for Sample 5 except that, as the filler (C), magnesium sulfate whiskers whiskers 1 were replaced by magnesium sulfate whiskers whiskers 2.

Sample 7

Sample 7 was prepared in the same manner as for Sample 5 except that, as the filler (C), magnesium sulfate whiskers whiskers 1 were replaced by glass particles 1.

Sample 8

Sample 8 was prepared in the same manner as for Sample 5 except that, as the filler (C), magnesium sulfate whiskers whiskers 1 were replaced by glass particles 2.

Sample 9

Mixed were 135 g of poly[2-(chloromethyl)oxirane-alt-4,4'-(propan-2,2-diyl)diphenol](Araldite 506 manufactured by Huntsman Corporation) as the second polymerizable compound (B) and 450 g of glass particles 2 as the filler (C). The mixture was kneaded at a revolution speed of 60 rpm and a rotation speed of 180 rpm for five minutes in a planetary-type kneader (HIVIS MIX 2P-1 manufactured by PRIMIX Corporation).

To the mixed solution, 112.5 g of urethane acrylate (CN983 manufactured by Sartomer Inc.), 81 g of diethylene glycol dimethacrylate (SR231 manufactured by Sartomer Inc.), and 27 g of bisphenol A-type epoxy acrylate (CN153 manufactured by Sartomer Inc.) as the first polymerizable compound (A), 4.5 g of diphenyl-2,4,6-trimethylbenzoyl phosphine oxide (Irgacure TPO) as the radical polymerization initiator (D), and 90 g of 4,4'-methylenebis(2,6-dimethylaniline) as the curing agent (E) were added, and the mixture was kneaded for further five minutes.

Sample 10

Sample 10 was prepared in the same manner as for Sample 5 except that, as the filler (C), magnesium sulfate whiskers whiskers 1 were replaced by glass fibers 1.

Sample 11

Sample 11 was prepared in the same manner as for Sample 5 except that, as the filler (C), magnesium sulfate whiskers whiskers 1 were replaced by glass fibers 2.

Sample 12

Sample 12 was prepared in the same manner as for Sample 5 except that, as the filler (C), magnesium sulfate whiskers whiskers 1 were replaced by glass fibers 3.

Sample 13

Mixed were 53 g of urethane diacrylate (CN983 manufactured by Sartomer Inc.), 348 g of trimethyl propane triacrylate, and 87.3 g of diacrylate (CN120Z manufactured by Sartomer Inc.) as the first polymerizable compound (A), 10 g of diphenyl(2,4,6-trimethylbenzoyl)phosphine oxide (Irgacure TPO) as the radical polymerization initiator (D), 25 g of an isobornyl acrylate solution containing 1500 ppm zinc(II) acetylacetonate monohydrate and 1 g of 2-(5-chloro-2-benzotriazolyl)-6-tert-butyl-p-cresol as the curing agent (E), and 480 g of 1,1-bis(4-isocyanatophenyl)ethane as the second polymerizable compound (B). The mixture was kneaded at a revolution speed of 60 rpm and a rotation speed of 180 rpm for five minutes in a planetary-type kneader (HIVIS MIX 2P-1 manufactured by PRIMIX Corporation).

Sample 14

Mixed were 42.4 g of urethane diacrylate (CN983 manufactured by Sartomer Inc.), 278 g of trimethyl propane triacrylate, and 70 g of diacrylate (CN120Z manufactured by Sartomer Inc.) as the first polymerizable compound (A), 8 g of diphenyl(2,4,6-trimethylbenzoyl)phosphine oxide (Irgacure TPO) as the radical polymerization initiator (D), 20 g of an isobornyl acrylate solution containing 1500 ppm zinc(II) acetylacetonate monohydrate and 0.8 g of 2-(5-chloro-2-benzotriazolyl)-6-tert-butyl-p-cresol as the curing agent (E), 384 g of 1,1-bis(4-isocyanatophenyl)ethane as the second polymerizable compound (B), and 200 g of carbon particles 1 as the filler (C). The mixture was kneaded at a revolution speed of 60 rpm and a rotation speed of 180 rpm for 10 minutes in a planetary-type kneader (HIVIS MIX 2P-1 manufactured by PRIMIX Corporation).

Sample 15

Sample 15 was prepared in the same manner as for Sample 14 except that the second polymerizable compound (B) and the filler (C) were fed into a planetary-type kneader (HIVIS MIX 2P-1 manufactured by PRIMIX Corporation) and kneaded at a revolution speed of 60 rpm and a rotation speed of 180 rpm for five minutes, then the components other than those described above were added thereto, and the mixture was kneaded for further five minutes.

Sample 16

Sample 16 was prepared in the same manner as for Sample 15 except that, as the filler (C), carbon particles 1 were replaced by carbon fibers 1.

Sample 17

Sample 17 was prepared in the same manner as for Sample 15 except that, as the filler (C), carbon particles 1 were replaced by metal particles 1.

Sample 18

Sample 18 was prepared in the same manner as for Sample 15 except that, as the filler (C), carbon particles 1 was replaced by metal fibers 1.

Sample 19

Mixed were 480 g of dodecan-1-yl methacrylate as the first polymerizable compound (A), 10 g of diphenyl-2,4,6-trimethylbenzoyl phosphine oxide (Irgacure TPO) as the radical polymerization initiator (D), 230 g of poly(propylene glycol)bis(2-aminopropyl ether) as the second polymerizable compound (B), and 230 g of 2,2'-dimethyl-4,4'-methylenebis(cyclohexan-1-ylamine) as the curing agent (E). The mixture was kneaded at a revolution speed of 60 rpm and a rotation speed of 180 rpm for five minutes in a planetary-type kneader (HIVIS MIX 2P-1 manufactured by PRIMIX Corporation).

Sample 20

Mixed were 480 g of dodecan-1-yl methacrylate as the first polymerizable compound (A), 10 g of diphenyl-2,4,6-trimethylbenzoyl phosphine oxide (Irgacure TPO) as the radical polymerization initiator (D), and 50 g of polysaccharide nanofibers 1 as the filler (C). The mixture was kneaded at a revolution speed of 60 rpm and a rotation speed of 180 rpm for five minutes in a planetary-type kneader (HIVIS MIX 2P-1 manufactured by PRIMIX Corporation).

Thereafter, 230 g of poly(propylene glycol)bis(2-aminopropyl ether) as the second polymerizable compound (B) and 230 g of 2,2'-dimethyl-4,4'-methylenebis(cyclohexan-1-ylamine) as the curing agent (E) were added, and the mixture was kneaded for further five minutes.

Sample 21

Sample 21 was prepared in the same manner as for Sample 20 except that the second polymerizable compound (B) and the filler (C) were kneaded at a revolution speed of 60 rpm and a rotation speed of 180 rpm for five minutes in a planetary-type kneader (HIVIS MIX 2P-1 manufactured by PRIMIX Corporation), then the components other than those described above were added thereto, and the mixture was kneaded for further five minutes.

Sample 22

Sample 22 was prepared in the same manner as for Sample 21 except that, as the filler (C), polysaccharide nanofibers 1 were replaced by polysaccharide nanofibers 2.

Sample 23

Sample 23 was prepared in the same manner as for Sample 21 except that, as the filler (C), 50 g of polysaccharide nanofibers 1 were replaced by 20 g of polysaccharide nanofibers 3.

Sample 24

Kneaded were 380 g of silicone acrylate (UV RCA 170 manufactured by Bluestar Silicones, Inc.) as the first polymerizable compound (A), 4 g of 2-methyl-1-(4-methylthiophenyl)-2-morpholinopropan-1-on (Irgacure 907) and 0.4 g of 2-isopropylthioxanthone as the radical polymerization initiator (D), 12 g of N,N-dimethyloctylamine as the curing agent (E), and 400 g of one-component addition cure-type silicone KE-1056 (manufactured by Shin-Etsu Chemical Co., Ltd.) as the second polymerizable compound (B) at a revolution speed of 60 rpm and a rotation speed of 180 rpm for five minutes in a planetary-type kneader (HIVIS MIX 2P-1 manufactured by PRIMIX Corporation).

Sample 25

Mixed were 380 g of silicone acrylate (UV RCA 170 manufactured by Bluestar Silicones, Inc.) as the first polymerizable compound (A), 4 g of 2-methyl-1-(4-methylthiophenyl)-2-morpholinopropan-1-on (Irgacure 907) and 0.4 g of 2-isopropylthioxanthone as the radical polymerization initiator (D), 12 g of N,N-dimethyloctylamine as the curing agent (E), and 1200 g of ceramic particles as the filler (C). The mixture was kneaded at a revolution speed of 60 rpm and a rotation speed of 180 rpm for five minutes in (HIVIS MIX 2P-1) manufactured by PRIMIX Corporation.

Thereafter, 400 g of one-component addition cure-type silicone KE-1056 (manufactured by Shin-Etsu Chemical Co., Ltd.) as the second polymerizable compound (B) was added thereto, and the mixture was kneaded for further five minutes.

Sample 26

Sample 26 was prepared in the same manner as for Sample 25 except that the second polymerizable compound (B) and the filler (C) were kneaded at a revolution speed of 60 rpm and a rotation speed of 180 rpm for five minutes in a planetary-type kneader (HIVIS MIX 2P-1 manufactured by PRIMIX Corporation), then the components other than those described above were added thereto, and the mixture was kneaded for further five minutes.

Sample 27

Sample 27 was prepared in the same manner as for Sample 26 except that, as the filler (C), ceramic particles 1 were replaced by ceramic fibers 1.

Sample 28

Sample 28 was prepared in the same manner as for Sample 26 except that, as the filler (C), ceramic particles 1 were replaced by clay mineral 1.

3. Production of Three-dimensional Shaped Object (First Three-Dimensional Shaping Method (SLA Method))

Resin compositions 1 to 28 (Samples 1 to 28) were each fed into shaping tank 510 of an apparatus for producing a three-dimensional shaped object, which has a structure shown in FIG. 1 Then, irradiation with semiconductor laser light (output power: 100 mW, wavelength: 355 nm) from light source 530 and lowering of shaping stage 520 were repeated to give a primary cured product in the shape of the JIS K7161-2 (ISO 527-2) 1A-type specimen. During production, the longitudinal direction of the tensile specimen was made to correspond to the shaping direction (stage lowering direction).

The primary cured product obtained was washed with isopropyl alcohol, and then heated in an oven at 150° C. for an hour for Samples 1 to 12, at 180° C. for an hour for Samples 13 to 18, at 120° C. for an hour for Samples 19 to 23, and at 130° C. for an hour for Samples 24 to 28 to thereby cure the second polymerizable compound (B).

(Second Three-Dimensional Shaping Method (CLIP Method))

For producing a three-dimensional shaped object, resin composition 650 was fed into shaping tank 610 of production apparatus 600 shown in FIG. 2A. A 0.0025-inch-thick Teflon (registered trademark) AF2400 film manufactured by Biogeneral Inc. (window part 615), which can allow oxygen, as a polymerization inhibitor, to pass therethrough, is disposed in the bottom part of shaping tank 610. As the atmosphere outside shaping tank 610, an oxygen atmosphere was used, and then, a pressure was moderately applied thereto. This caused formation of buffer region 642 containing resin composition 650 and oxygen on the bottom part side of shaping tank 610, and in the part above buffer region 642, region for curing 644 having an oxygen concentration lower than that of the buffer region was formed.

Stage 620 was elevated while irradiated planarly with light from an ultraviolet light source: LED projector (DLP (VISITECH LE4910H UV-388) manufactured by Texas Instruments Incorporated). The irradiation intensity of the ultraviolet ray at this time was set to 5 mW/cm$^2$. The elevation rate of stage was set to 50 mm/hr. Then, produced was a primary cured product in the shape of the JIS K7161-2 (ISO 527-2) 1A-type specimen. During production, the longitudinal direction of the tensile specimen was made to correspond to the shaping direction (elevation direction for stage 620). The primary cured product obtained was washed with isopropyl alcohol and then heated in an oven at 150° C. for an hour for Samples 1 to 12, at 180° C. for an hour for Samples 13 to 18, at 120° C. for an hour for Samples 19 to 23, and 130° C. for an hour for Samples 24 to 28 to thereby cure the second polymerizable compound (B).

4. Strength Evaluation of Three-Dimensional Shaped Object

The strength of the three-dimensional shaped objects obtained was evaluated in a tensile test according to JIS K7161-1. At this time, the distance between the gripping jaws was set to 115 mm, and the test speed was set to 5 mm/minute. Then, the value obtained by dividing the stress at break by the cross-sectional area of the specimen was calculated as the tensile strength.

The value was evaluated based on the following criteria.

AA: The improved ratio of strength is 50% or more with respect to the strength of the specimen shaped without a filler.

A: The improved ratio of strength is 10% or more and less than 50% with respect to the strength of the specimen shaped without a filler.

B: The improved ratio of strength is more than 0% and less than 10% with respect to the strength of the specimen shaped without a filler.

D: The strength was not improved or the reduced ratio of strength was less than 10% with respect to the strength of the specimen shaped without a filler.

E: The reduced ratio of strength was 10% or more with respect to the strength of the specimen shaped without a filler.

5. Analysis on Filler Surface

The surface of the fillers contained in the three-dimensional shaped objects was analyzed to confirm whether the filler surface was coated with any resin or the like. Specifically, the three-dimensional shaped object mentioned above was polished by a mechanical polishing apparatus (EcoMet 250 Pro manufactured by Buehler) to produce a cross section. Then, an infrared microscope HYPERION 3000 manufactured by Bruker Optics K.K. was used to perform the microscopic ATR imaging measurement by means of a two dimensional array detector (numbers of elements: 64×64).

On the basis of an observation on images with the microscope, an infrared absorption spectrum (1) of a resin region adjacent to the filler (0.5 μm×0.5 μm) and an infrared absorption spectrum (2) of a region at a 1-μm or more distance from the filler (0.5 μm×0.5 μm) were obtained and compared with each other.

For example, in Sample 3, Sample 4, and Sample 14, the spectrum (1) and the spectrum (2) were substantially comparable and the like, and it can thus be said that the filler (C) was coated with the first polymerizable compound (A) and the second polymerizable compound (B). Meanwhile, in Sample 2, Sample 20, and Sample 25, the absorption peak at 1250 $cm^{-1}$ and the absorption peak near 1160 $cm^{-1}$ in the spectrum (1) were obviously higher than those in the spectrum (2). The absorption near 1250 $cm^{-1}$ and 1160 $cm^{-1}$ is assigned to the C—O—C stretch of the (meth)acryloyl group, and it can be said that the filler (C) was coated with the first polymerizable compound (A). Meanwhile, in Samples 5 to 12, 15 to 18, 21 to 23, and 26 to 28, the absorption peak at 1250 $cm^{-1}$ and the absorption peak near 1160 $cm^{-1}$ in the spectrum (1) were obviously lower than those in the spectrum (2). In Samples 5 to 12, the absorption peak near 910 $cm^{-1}$ in the spectrum (1) was obviously higher than that in the spectrum (2). The absorption near 910 $cm^{-1}$ is assigned to the C—O stretch of the epoxy group, and it can be said that the filler (C) was coated with the second polymerizable compound (B).

In Samples 15 to 18, the absorption peak near 1560 $cm^{-1}$ in the spectrum (1) was obviously higher than that in the spectrum (2). The absorption near 1560 $cm^{-1}$ is assigned to vibration of the —C═N— skeleton of the triazine ring, and it can be said that the filler (C) was coated with the second polymerizable compound (B).

In Samples 21 to 23, the absorption peak near 1740 $cm^{-1}$ in the spectrum (1) was obviously higher than that in the spectrum (2). The absorption near 1740 $cm^{-1}$ is assigned to C═O in the urethane bond, and it can be said that the filler (C) was coated with the second polymerizable compound (B).

In Samples 26 to 28, the absorption peak near 2280 $cm^{-1}$ in the spectrum (1) was obviously higher than that in the spectrum (2). The absorption near 2280 $cm^{-1}$ is assigned to the Si—H stretch of the hydrosilyl group contained in the addition cure-type silicone, and it can be said that the filler (C) was coated with the second polymerizable compound (B).

TABLE 1

| | | Composition | | | | Amount | | Strength | |
| --- | --- | --- | --- | --- | --- | --- | --- | --- | --- |
| | | First polymerizable compound (A) | Second polymerizable compound (B) | Filler (C) | Filler surface treatment | of filler added (wt %) | Coating of filler | Shaping method 1 | Shaping method 2 |
| Comparative Example | Sample 1 | Urethane acrylate + methacrylate + epoxy acrylate | Epoxy-based compound | No | — | — | — | — | — |
| Comparative Example | Sample 2 | | | Whiskers 1 | No | 10 | Component (A) | D | E |
| Comparative Example | Sample 3 | | | Whiskers 1 | No | 10 | Component (A) + (B) | D | E |
| Comparative Example | Sample 4 | | | Whiskers 1 | No | 10 | Component (A) + (B) | D | E |
| Example | Sample 5 | | | Whiskers 1 | No | 10 | Component (B) | A | A |
| Example | Sample 6 | | | Whiskers 2 | N-2-(Aminoethyl)-3-aminopropyltrimethoxysilane | 10 | Component (B) | AA | AA |
| Example | Sample 7 | | | Glass particles 1 | No | 10 | Component (B) | C | B |
| Example | Sample 8 | | | Glass particles 2 | 3-Glycidoxypropyltrimethoxysilane | 10 | Component (B) | B | A |
| Example | Sample 9 | | | Glass particles 2 | 3-Glycidoxypropyltrimethoxysilane | 50 | Component (B) | B | A |
| Example | Sample 10 | | | Glass fibers 1 | No | 10 | Component (B) | B | A |
| Example | Sample 11 | | | Glass fibers 2 | Hexyltriethoxysilane | 10 | Component (B) | B | A |
| Example | Sample 12 | | | Glass fibers 3 | 3-Aminopropyltrimethoxysilane | 10 | Component (B) | A | AA |
| Comparative Example | Sample 13 | Urethane acrylate + acrylate | Cyanate ester-based compound | No | — | — | — | — | — |
| Comparative Example | Sample 14 | | | Carbon particles 1 | No | 20 | Component (A) + (B) | D | E |
| Example | Sample 15 | | | Carbon particles 1 | No | 20 | Component (B) | B | B |
| Example | Sample 16 | | | Carbon fibers 1 | 3-Isocyanatepropyltriethoxysilane | 20 | Component (B) | A | AA |

TABLE 1-continued

| | | Composition | | | | | Strength | |
|---|---|---|---|---|---|---|---|---|
| | | First polymerizable compound (A) | Second polymerizable compound (B) | Filler (C) | Filler surface treatment | Amount of filler added (wt %) | Coating of filler | Shaping method 1 | Shaping method 2 |
| Example | Sample 17 | | | Metal particles 1 | No | 20 | Component (B) | C | B |
| Example | Sample 18 | | | Metal fibers 1 | Hexamethyldisilazane | 20 | Component (B) | B | A |

TABLE 2

| | | Composition | | | |
|---|---|---|---|---|---|
| | | First polymerizable compound (A) | Second polymerizable compound (B) | Filler (C) | Filler surface treatment |
| Comparative Example | Sample 19 | Methacrylate | Urethane-based compound | No | — |
| Comparative Example | Sample 20 | | | Polysaccharide nanofibers 1 | No |
| Example | Sample 21 | | | Polysaccharide nanofibers 1 | No |
| Example | Sample 22 | | | Polysaccharide nanofibers 2 | 3-Isocyanatepropyltriethoxysilane |
| Example | Sample 23 | | | Polysaccharide nanofibers 3 | No |
| Comparative Example | Sample 24 | Silicone acrylate | Silicone-based compound | No | — |
| Comparative Example | Sample 25 | | | Ceramic particles 1 | No |
| Example | Sample 26 | | | Ceramic particles 1 | No |
| Example | Sample 27 | | | Ceramic fibers 1 | Vinyltrimethoxysilane |
| Example | Sample 28 | | | Clay mineral 1 | No |

| | | Composition | | Strength | |
|---|---|---|---|---|---|
| | | Amount of filler added (wt %) | Coating of filler | Shaping method 1 | Shaping method 2 |
| Comparative Example | Sample 19 | — | — | — | — |
| Comparative Example | Sample 20 | 5 | Component (A) | D | E |
| Example | Sample 21 | 5 | Component (B) | B | A |
| Example | Sample 22 | 5 | Component (B) | A | AA |
| Example | Sample 23 | 2 | Component (B) | B | A |
| Comparative Example | Sample 24 | — | — | — | — |
| Comparative Example | Sample 25 | 20 | Component (A) | D | E |
| Example | Sample 26 | 20 | Component (B) | C | B |
| Example | Sample 27 | 20 | Component (B) | A | AA |
| Example | Sample 28 | 20 | Component (B) | B | A |

As shown in Table 1 and Table 2 above, even if a filler was contained in the resin composition, in the case where the resin with which the filler (C) was coated was the first polymerizable compound (A) (radical polymerizable compound) or a mixture of the first polymerizable compound (A) and the second polymerizable compound (B), the strength was not improved or the strength decreased in either of the shaping methods (Samples 2 to 4, 14, 20, and 25), in comparison with Samples containing no filler (Samples 1, 13, 19, and 24). In the case where the first polymerizable compound (A) was present around the filler (C) on curing the resin composition, it is assumed that the polymerization of the first polymerizable compound (A) was likely to be inhibited by oxygen adsorbed by the filler (C) and thus the strength was likely to decrease. Particularly, the second method (the method for curing the resin composition while supplying oxygen as a polymerization suppressor) was more likely to cause a decrease in the strength of the three-dimensional shaped object than the first method.

In contrast, in the case where the filler (C) was coated with the second polymerizable compound (B), the strength of the three-dimensional shaped object obtained was improved (Samples 5 to 12, 15 to 18, 21 to 23, and 26 to 28). In the case where the filler (C) was coated with the second polymerizable compound (B), it is assumed that the first polymerizable compound (A) was unlikely to be affected by oxygen even if the filler (C) had adsorbed oxygen and the effect of adding the filler, that is, the effect of improving the strength of the three-dimensional shaped object was easily obtained. Also in these Samples, three-dimensional shaped objects produced by the second method had higher strength. Since the second method continuously forms a three-dimensional shaped object without forming a first shaped object layer, it is assumed that areas having a locally low strength were unlikely to occur.

Further, in the case where the shape of the filler (C) was fibrous, the strength of the three-dimensional shaped objects was likely to increase (for example, in the comparison between Sample 7 and Sample 10). In contrast, in the case where the filler (C) had been treated with a treating agent having a functional group reactive with the second polymerizable compound (B) (Samples 6, 8, 9, 12, 16, 22, and 27), the strength of the three-dimensional shaped object was likely to increase.

This application claims the benefit of Japanese Patent Application No. 2017-182476 filed on Sep. 22, 2017, the disclosure of which including the specification and drawings is incorporated herein by reference in its entirety.

INDUSTRIAL APPLICABILITY

According to the resin composition of the present invention, it is possible to produce a three-dimensional shaped object at a moderate rate and with high dimensional accuracy, and a three-dimensional shaped object to be obtained has a high strength. Accordingly, the present invention is expected to broaden applications of three-dimensional shaped objects including the resin composition and to contribute to development and proliferation of the techniques of the field.

REFERENCE SIGNS LIST

500, 600 Production apparatus
510, 610 Shaping tank
615 Window part
520, 620 Shaping Stage
521 Base
530, 630 Light source
531 Galvano mirror
642 Buffer region
644 Region for curing
550, 650 Resin composition
651 Cured product

The invention claimed is:

1. A resin composition that is used in a method for producing a three-dimensional shaped object comprising a cured product of the resin composition by selectively irradiating a liquid resin composition with an active energy ray, at least comprising:
   a first polymerizable compound liquid at normal temperature, the first polymerizable compound having radical polymerizability;
   a second polymerizable compound liquid at normal temperature, the second polymerizable compound having no radical polymerizability; and
   a filler, wherein
   the surface of the filler is coated with the second polymerizable compound, and
   the filler comprises particles having an average particle size of 0.6 to 200 μm or fibers having an average fiber length of 0.2 to 200 μm.

2. The resin composition according to claim 1, wherein the second polymerizable compound has a group that is polymerized by any of heat, a microwave, actinic radiation, water, an acid, a base, and an active energy ray.

3. The resin composition according to claim 1, wherein the filler is at least one selected from the group consisting of organic polymer fibers, whisker-like inorganic compounds, clay compounds, glass, ceramics, metals, and carbon.

4. The resin composition according to claim 1, wherein the filler is fibrous.

5. The resin composition according to claim 3, wherein the organic polymer fibers are polysaccharide nanofibers.

6. The resin composition according to claim 1, wherein the filler is surface-treated with a treating agent having a functional group reactive with the second polymerizable compound.

7. The resin composition according to claim 6, wherein the treating agent is a silane coupling agent.

8. The resin composition according to claim 1, wherein the first polymerizable compound is an unsaturated carboxylate compound and/or an unsaturated carboxylic acid amide compound.

9. The resin composition according to claim 1, wherein the second polymerizable compound comprises at least one group selected from the group consisting of a cyclic ether group, a cyanate group, an isocyanate group, and a hydrosilyl group.

10. A method for producing a three-dimensional shaped object comprising:
    selectively irradiating the resin composition according to claim 1 with an active energy ray to produce a primary cured product comprising a cured product of the first polymerizable compound.

11. The method for producing a three-dimensional shaped object according to claim 10, comprising:
    selectively irradiating the resin composition filled in a shaping tank with an active energy ray to form a first shaped object layer comprising a cured product of the first polymerizable compound,
    supplying the resin composition on the first shaped object layer, and
    selectively irradiating the resin composition supplied in the supplying of the resin composition with an active energy ray to form a second shaped object layer comprising a cured product of the first polymerizable compound on the first shaped object layer, wherein
    the supplying of the resin composition and the forming of the second shaped object layer are repeated to thereby three-dimensionally form the primary cured product.

12. The method for producing a three-dimensional shaped object according to claim 10, comprising:
adjacently forming, in a shaped object tank, a buffer region comprising the resin composition and oxygen, where the curing of the first polymerizable compound is inhibited by oxygen, and a region for curing comprising at least the resin composition, where the concentration of oxygen is lower than that in the buffer region and the curing of the first polymerizable compound is enabled, and
selectively irradiating the resin composition with an active energy ray from a side of the buffer region to cure the first polymerizable compound in the region for curing, wherein
in the curing of the first polymerizable compound, the region for curing is continuously irradiated with an active energy ray while the cured product formed is continuously moved in a direction opposite to the buffer region to form the primary cured product.

13. The method for producing a three-dimensional shaped object according to claim 10, comprising curing the second polymerizable compound contained in the primary cured product by means of heat, a microwave, actinic radiation, water, an acid, a base, or an active energy ray after the formation of the primary cured product.

14. A three-dimensional shaped object, wherein the three-dimensional shaped object is a cured product of the resin composition according to claim 1.

\* \* \* \* \*